(12) United States Patent
Kawasaki et al.

(10) Patent No.: US 7,907,042 B2
(45) Date of Patent: Mar. 15, 2011

(54) DC-DC CONVERTER WITH INTEGRATED TRANSFORMER ASSEMBLY COMPOSED OF TRANSFORMER PAIR

(75) Inventors: Koji Kawasaki, Okazaki (JP); Tsuyoshi Yamashita, Anjo (JP)

(73) Assignees: Denso Corporation, Kariya, Aichi-Pref. (JP); Nippon Soken, Inc., Nishio, Aichi-Pref. (JP)

( * ) Notice: Subject to any disclaimer, the term of this patent is extended or adjusted under 35 U.S.C. 154(b) by 320 days.

(21) Appl. No.: 11/928,259

(22) Filed: Oct. 30, 2007

(65) Prior Publication Data

US 2008/0101097 A1    May 1, 2008

(30) Foreign Application Priority Data

Oct. 31, 2006   (JP) ................................. 2006-296539

(51) Int. Cl.
   *H01F 5/00*    (2006.01)
(52) U.S. Cl. .......................................... 336/200; 363/20
(58) Field of Classification Search .................... 363/16, 363/17, 20, 21.01, 22, 24, 49, 50; 336/200.212, 336/220–223
   See application file for complete search history.

(56) References Cited

U.S. PATENT DOCUMENTS

| | | | | |
|---|---|---|---|---|
| 3,686,561 A * | 8/1972 | Spreadbury | ................ | 323/308 |
| 4,333,135 A * | 6/1982 | Schwarz | ................ | 363/28 |
| 4,628,426 A * | 12/1986 | Steigerwald | ................ | 363/17 |
| 5,291,382 A * | 3/1994 | Cohen | ................ | 370/392 |
| 5,508,903 A * | 4/1996 | Alexndrov | ................ | 363/16 |
| 5,771,163 A * | 6/1998 | Moriguchi et al. | ................ | 363/71 |
| 6,151,231 A * | 11/2000 | Saint-Pierre et al. | ................ | 363/95 |
| 6,324,080 B1 * | 11/2001 | Laeuffer | ................ | 363/25 |
| 7,130,203 B2 * | 10/2006 | Mbaye | ................ | 363/56.12 |
| 7,254,046 B2 * | 8/2007 | Kawasaki et al. | ................ | 363/21.12 |
| 2005/0047175 A1 * | 3/2005 | Kawasaki et al. | ................ | 363/16 |
| 2008/0084714 A1 * | 4/2008 | Kawasaki et al. | ................ | 363/21.01 |
| 2008/0101097 A1 * | 5/2008 | Kawasaki et al. | ................ | 363/20 |

FOREIGN PATENT DOCUMENTS

JP   2005-051994   2/2005
JP   2005-051995   2/2005

* cited by examiner

*Primary Examiner* — Adolf Berhane
*Assistant Examiner* — Yemane Mehari
(74) *Attorney, Agent, or Firm* — Nixon & Vanderhye PC

(57) ABSTRACT

In an integrated transformer assembly, a common coil member has a first portion alternately wound, for each one electromagnetic turn, around the first core member and around the second core member. The first portion of the common primary coil member wound around the first core member is magnetically linked to the first magnetic path thereof so as to constitute a first primary coil. The first portion of the common primary coil member wound around the second core member is magnetically linked to the second magnetic path thereof so as to constitute a second primary coil. The first and second primary coils are connected in series. A secondary coil member has first and second secondary coils. The first and second secondary coils are arranged to be magnetically linked to the first and second primary coils of the common primary coil member, respectively.

14 Claims, 27 Drawing Sheets

FOURTH MODE (t3~t4)

FIFTH MODE (t4~t5)

D=30%

DC-DC CONVERTER WITH INTEGRATED TRANSFORMER ASSEMBLY COMPOSED OF TRANSFORMER PAIR

CROSS REFERENCE TO RELATED APPLICATION

This application is based upon and claims the benefit of priority of the prior Japanese Patent Application 2006-296539 filed on Oct. 31, 2006 so that the contents of which are incorporated herein by reference.

FIELD OF THE INVENTION

The present invention relates to DC (direct current) to DC converters with an integrated transformer assembly composed of a transformer pair.

BACKGROUND OF THE INVENTION

DC to DC converters with a transformer are configured to completely isolate between input and output thereof, and therefore, they have been widely used.

In such DC to DC converters, DC to DC converters with a pair of transformers have been well-known, some of which are disclosed in U.S. Pat. No. 7,254,046 B2 corresponding to Japanese Unexamined Patent Publications No. 2005-51994 and No. 2005-51995.

In the US patent Publication, one type of DC to DC converters is provided with a first converting circuit between an input DC power source and a pair of first and second transformer assemblies 15 and 16, and with a second converting circuit between a load and the pair of first and second transformer assemblies T1 and T2.

The first transformer assembly T1 includes a core, a first primary winding W1, a second primary winding W2, and a first secondary winding W3. The second transformer assembly T2 includes a core, a third primary winding W4, a fourth primary winding W5, and a second secondary winding W6.

The first converting circuit includes a first switching element Q1 and a second switching element Q2, which are controlled to be complementarily turned on and off. Similarly, the second converting circuit includes a third switching element Q3 and a fourth switching element Q4, which are controlled to be complementarily turned on and off.

The complementary switchings of the first and second switching elements Q1 and Q2 and those of the third and fourth switching elements Q3 and Q4 allow the first and second transformers T1 and T2 to operate alternately as a transformer and a reactor.

In the US patent Publication, another type of DC to DC converters is disclosed. In another type of DC to DC converters, paired first and second transformer assemblies T1 and T2 are structurally integral with each other so as to at least partially have an integral core at least part of which serves as a common magnetic path therebetween. The integral structure of the first and second transformer assemblies T1 and T2 can reduce its total size. The integral structure of DC to DC converters having a common magnetic path between paired first and second transformer assemblies will be referred to as "common magnetic-path structure" hereinafter.

The first to fourth switching elements Q1 to Q4 are individually turned on and off at a high frequency so that high frequency switching currents caused by the high frequency switchings are adapted to flow through the first and second transformer assemblies. For this reason, ferrite-powder cores or the like, which allow such a high-frequency switching current to flow therethrough, are preferably used as the cores of the first and second transformers T1 and T2.

SUMMARY OF THE INVENTION

In DC to DC converters with the common magnetic-path structure, the common magnetic path between the paired first and second transformer assemblies has a cross section orthogonal to the length direction thereof. The cross section of the common magnetic path is designed to have an area that allows the sum of a magnetic flux $\phi1$ created by the first transformer T1 and a magnetic flux $\phi2$ created by the second transformer T2 to be passed. The sum of the magnetic flux $\phi1$ and the magnetic flux $\phi2$ will be referred to as "total magnetic flux" hereinafter.

For this reason, the number of components of the DC to DC converter with the common magnetic-path structure can be reduced.

In addition, the orientations of the first and second magnetic fluxes $\phi1$ and $\phi2$ are determined to reduce the upper limit of the total magnetic flux, making it possible to reduce, in total size and weight, the DC to DC converter with the common magnetic-path structure as compared with DC to DC converters with a pair of separated transformers.

However, the integral core of a DC to DC converter with the common-magnetic path structure may have a specific structure, which may make it difficult to use, as the integral core, a general-purpose core for normal transformers in order to manufacture a DC to DC converter with the common-magnetic path structure. This may cause the cost of manufacturing a DC to DC converter with the common-magnetic path structure to increase.

In view of the circumstances set forth above, an object of at least one aspect of the present invention is to provide DC to DC converters with an integrated transformer assembly composed of a pair of first and second transformers, which allow reduction in size and/or weight of the integrated transformer assembly while maintaining the cost of manufacturing it.

According to one aspect of the present invention, there is provided an integrated transformer assembly. The integrated transformer assembly includes a first core member constituting a first magnetic path, and a second core member constituting a second magnetic path. The second magnetic path is separated from the first magnetic path. The integrated transformer assembly includes a common coil member having a first portion configured to be alternately wound, for each one electromagnetic turn, around the first core member and around the second core member. The first portion of the common primary coil member wound around the first core member is magnetically linked to the first magnetic path thereof so as to constitute a first primary coil. The first portion of the common primary coil member wound around the second core member is magnetically linked to the second magnetic path thereof so as to constitute a second primary coil. The first primary coil and the second primary coil are connected in series. The integrated transformer assembly includes a secondary coil member having a first secondary coil and a second secondary coil, the first and second secondary coils being arranged to be magnetically linked to the first and second magnetic paths of the first and second core members, respectively.

According to another aspect of the present invention, there is provided a DC to DC converter. The DC to DC converter includes an integrated transformer assembly according to one aspect of the present invention. The first primary coil, the first secondary coil, and the first core member constitute a first transformer. The second primary coil, the second secondary coil, and the second core member constitute a second transformer. The DC to DC converter includes an inverter circuit provided with at least one switching element via which input DC power is supplied. The inverter circuit is configured to turn the at least one switching element on and off in accordance with a predetermined duty cycle to convert the input DC power into AC power, thus supplying the converted AC power to the first and second primary coils of the first and second transformers. The first and second transformers are configured to alternately execute a transformer operation and a reactor operation so as to generate secondary AC power in the first and second secondary coils of the integrated transformer assembly. The DC to DC converter includes a rectifier configured to rectify the secondary AC power generated in the first and second secondary coils to thereby output DC power.

According to a further aspect of the present invention, there is provided a DC to DC converter. The DC to DC converter includes an integrated transformer assembly. The integrated transformer assembly includes a core member constituting a magnetic path. The core member includes a base having one surface, and a pair of first and second poles each arranged opposing the one surface of the base to be magnetically coupled thereto. The pair of first and second poles extends away from the one surface of the base. The first and second poles are arranged opposing each other with a first gap therebetween. Each of the first and second poles has a substantially semicircular cross section orthogonal to the magnetic path in a corresponding one of the first and second poles. The first and second poles with the gap collectively have one of a substantially circular cross section and a substantially ellipsoidal cross section. The one of the substantially circular cross section and the substantially ellipsoidal cross section is orthogonal to the magnetic path in each of the first and second poles. The integrated transformer assembly includes a second pole member arranged opposing the one surface of the base to be magnetically coupled thereto. The second pole member extends away from the one surface of the base. The second pole member at least partially surrounds the pair of first and second poles. The integrated transformer assembly includes a primary coil member composed of a first primary coil and a second primary coil connected to each other in series. The first and second primary coils are collectively wound around the paired first and second poles. The first primary coil is magnetically linked to the magnetic path of the first pole. The second primary coil is magnetically linked to the magnetic path in the second pole. The integrated transformer assembly includes a secondary coil member composed of a first secondary coil and a second secondary coil. The first and second secondary coils are wound around the first and second poles to be magnetically linked to the magnetic paths of the first and second poles, respectively. The first primary coil, the first secondary coil, and the core constitute a first transformer. The second primary coil, the second secondary coil, and the core constitute a second transformer. The DC to DC converter includes an inverter circuit provided with at least one switching element via which input DC power is supplied. The inverter circuit is configured to turn the at least one switching element on and off in accordance with a predetermined duty cycle to convert the input DC power into AC power, thus supplying the converted AC power to the first and second primary coils of the first and second transformers. The first and second transformers are configured to alternately execute a transformer operation and a reactor operation so as to generate secondary AC power in the first and second secondary coils of the integrated transformer assembly. The DC to DC converter includes a rectifier configured to rectify the secondary AC power generated in the first and second secondary coils to thereby output DC power.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Figure 1:
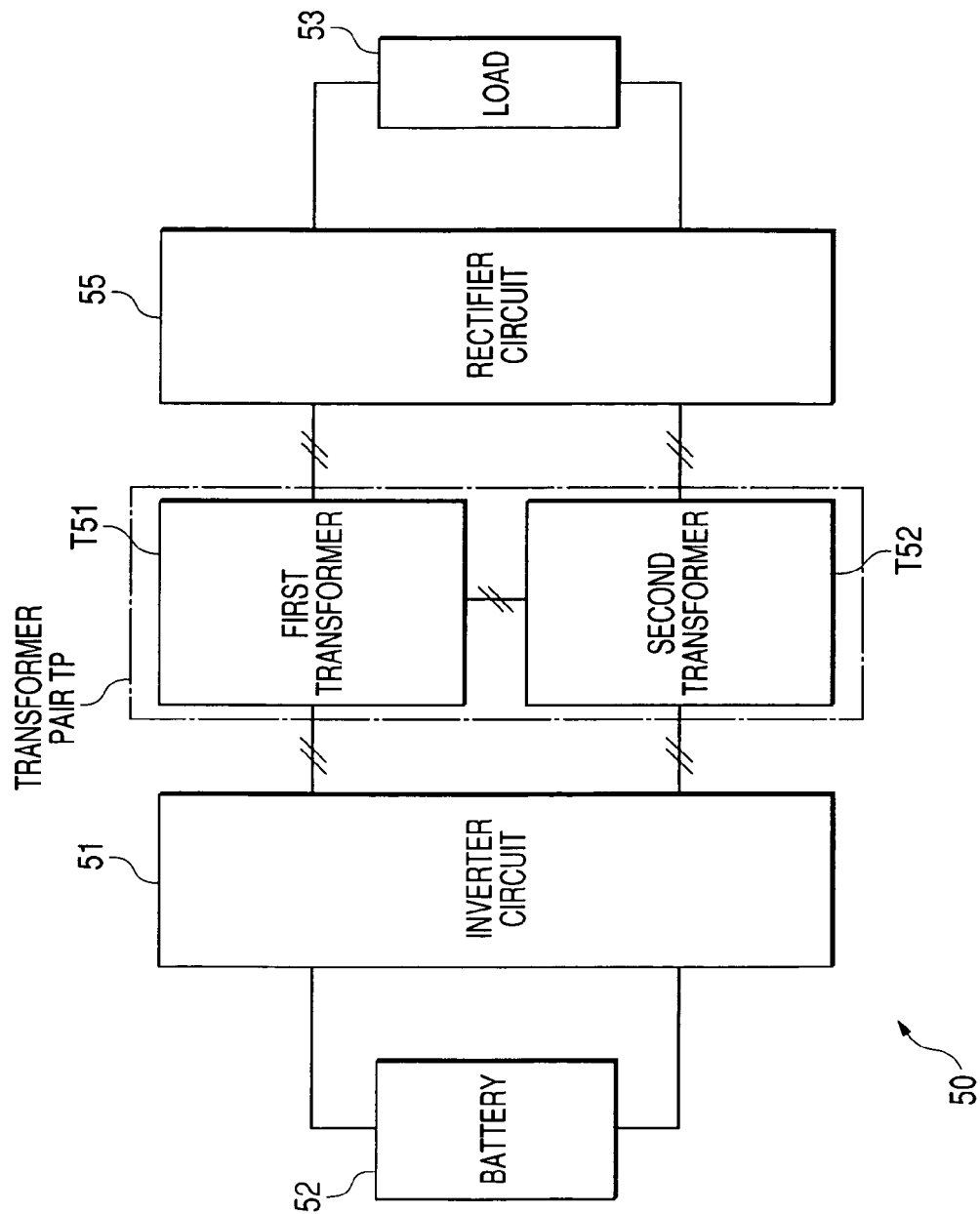
FIG. 1 is a block diagram schematically illustrating an example of the structure of a DC to DC converter according to an embodiment of the present invention.

An embodiment of DC to DC converters according to the present invention will be described hereinafter with reference to the accompanying drawings.

A skeleton structure of a DC to DC converter 50 with a pair of first and second transformers and operations thereof according to the embodiment of the present invention will be described in accordance with FIG. 1.

The DC to DC converter 50 serves as a unidirectional step up/down converter, the input side of which is coupled to an input DC power source (battery) 52. The output side of the DC to DC converter 100 is coupled to a load 53.

The DC to DC converter 50 includes a transformer pair TP that consists of a pair of first and second transformers (transformer assemblies) T51 and T52. The DC to DC converter 50 also includes an inverter circuit 51 and a rectifier circuit 55.

The inverter circuit 51 is arranged between the input DC power source 52 and the first and second transformers T51 and T52. The rectifier circuit 55 is arranged between the load 53 and the first and second transformers T51 and T52.

The inverter circuit 51 is operative to convert DC power supplied from the input DC power source 52 into AC power. The inverter circuit 51 can receive DC power on which an AC power component is superimposed.

The first transformer T51 is composed of a primary winding and a secondary winding to be magnetically linked to each other. Similarly, the second transformer T52 is composed of a primary winding and a secondary winding to be magnetically coupled to each other.

The primary winding of the first transformer T51 is connected to that of the second transformer T52 in series. The primary winding of the first transformer T51 such that at least an AC component supplied from the inverter circuit 51 is supplied thereto. Note that the inverter circuit 51 can supply, to the primary winding of the first transformer T51, a direct current on which an AC component is superimposed.

In an operating mode A during a predetermined period (referred to as "mode A period" hereinafter), the inverter circuit 51 works to increase a primary current supplied to the primary winding of the first transformer T51, and reduce a primary current supplied to the primary winding of the second transformer T52.

In an operating mode B during a predetermined period (referred to as "mode B period" hereinafter) next to the mode A period, the inverter circuit 51 works to reduce the primary current supplied to the primary winding of the first transformer T51, and increase the primary current supplied to the primary winding of the second transformer T52.

Note that the word "increase" equivalently means decrease in a reverse current, and the word 'decrease' equivalently means increase in a reverse current.

The operations of the inverter circuit 51 allows a magnetic flux created by the first transformer T51 to increase during the mode A period, and to decrease during the mode B period. Similarly, the operations of the inverter circuit 51 allows a magnetic flux created by the second transformer T52 to decrease during the mode A period, and to increase during the mode B period.

The change in the magnetic flux created in the first transformer T51 induces a secondary voltage across the secondary winding thereof during the mode B period. In other words, the first transformer T51 operates as a transformer during the mode B period so as to induce a secondary voltage across the secondary winding thereof.

Similarly, the change in the magnetic flux created in the second transformer T52 induces a secondary voltage across the secondary winding thereof the mode A period. In other words, the second transformer T52 operates as a transformer during the mode A period so as to induce a secondary voltage across the primary ending thereof.

The rectifier circuit 55 is operative to transfer the secondary voltage induced in the second transformer T52 to the load 53 during the mode A period.

The rectifier circuit 55 is also operative to transfer the secondary voltage induced in the first transformer T51 to the load 53 during the mode B period.

Specifically, the first transformer T51 operates as a choke coil (reactor) during the mode A period in relation to the inverter circuit 51, and the second transformer T52 operates as a choke coil (reactor) during the mode B period in relation to the inverter circuit 51.

The reactor operation of the first transformer T51 allows the state of magnetic flux therein changed by the transformer operation of the first transformer T51 during the mode B period to be returned to its original state of magnetic flux (the beginning of the mode B period).

Similarly, the reactor operation of the second transformer T52 allows the state of magnetic flux changed by the second transformer T52 during the mode A period to be returned to its original state of magnetic flux (the beginning of the mode A period).

Note that the configuration and operations of the DC to DC converter 50 have been included in, for example, U.S. Pat. No. 7,254,046 B2. Because the US patent is assigned to the same assignee as that of this application, disclosures of which are incorporated herein by reference.

Figure 2:
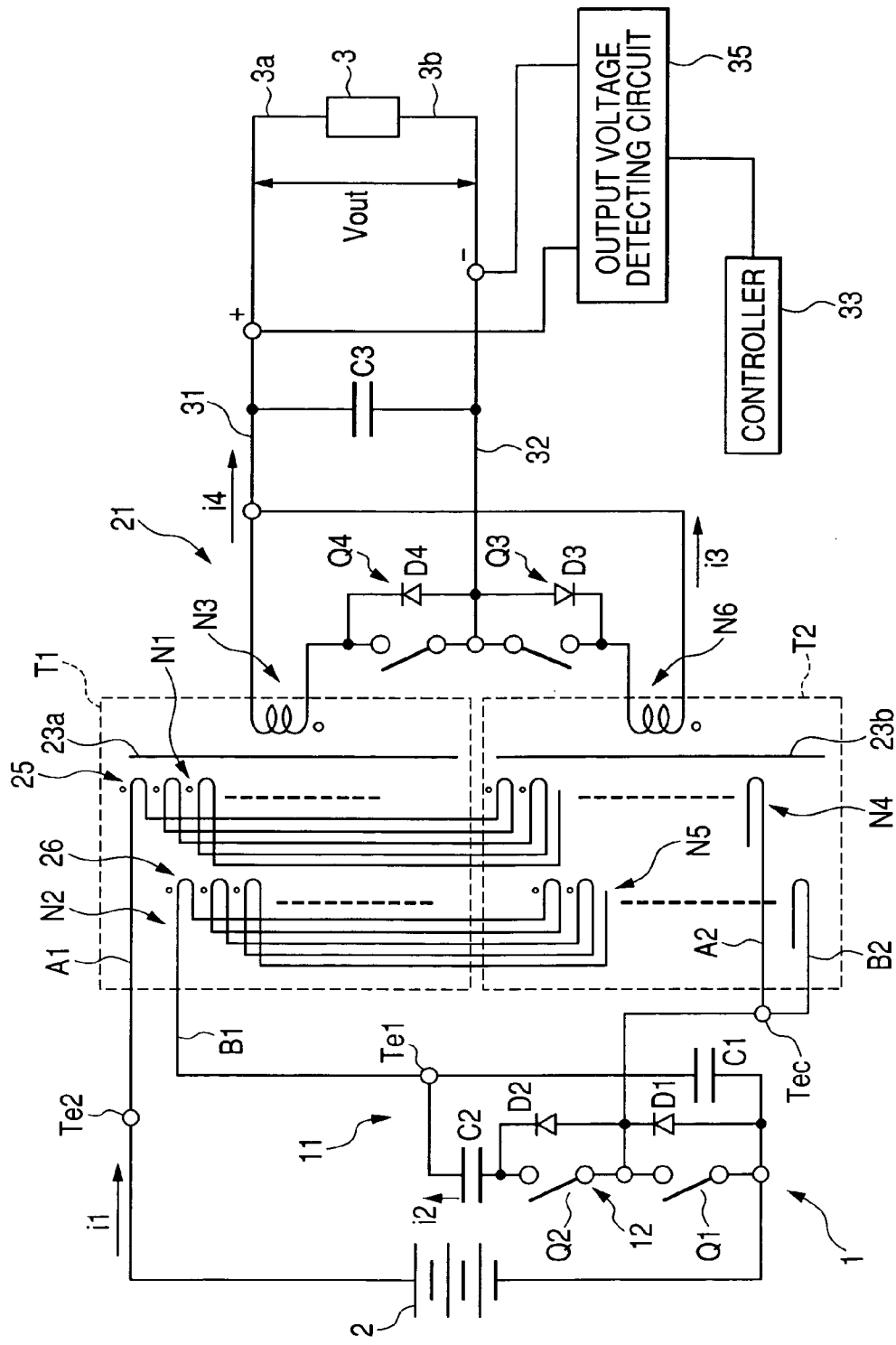
FIG. 2 is a circuit diagram schematically illustrating a configuration example of the DC to DC converter illustrated in FIG. 1.

Next, such a DC to DC converter with a configuration example of the DC to DC converter 50 is illustrated in FIG. 2. The DC to DC converter 1 illustrated in FIG. 2 is disclosed in the U.S. Pat. No. 7,254,046 B2. Therefore, for further detailed information about the structure and operations of the DC to DC converter 1 illustrated in FIG. 2, please see the U.S. Pat. No. 7,254,046 B2.

Referring to FIG. 2, the DC to DC converter 1 serves as a unidirectional step down converter. Specifically, the input side of the DC to DC converter 1 is connected to a high-voltage input DC power source (battery) 2, as a high-voltage battery. The output side of the DC to DC converter 1 is connected to a low-voltage load 3.

As the DC to DC converter 1, a unidirectional step up converter may be used, and as the low-voltage load 3, a low-voltage power source for supplying a DC voltage lower than a DC voltage to be supplied from the battery 2 may be used.

The DC to DC converter 1 includes a first transformer T1, a second transformer T2, and an inverter circuit 11. The inverter circuit 11 includes a first switching element Q1, a capacitor C1, and an active clamp circuit 12. The active clamp circuit 12 consists of a second switching element Q2 and a capacitor C2.

The DC to DC converter 1 includes a synchronous rectifier 21, a controller 33, and an output voltage detecting circuit 35. The synchronous rectifier 21 consists of a capacitor C3, a third switching element (an output switching element) Q3, and a fourth switching element (an output switching element) Q4.

The controller 33 is connected to each of the first to fourth switching elements Q1 to Q4 and operative to individually turn on and off each of the first to fourth switching elements Q1 to Q4.

The on and off switchings of the first and second switching elements Q1 and Q2 of the inverter circuit 11 are operative to convert an input DC voltage supplied from the battery 2 into an AC voltage and to supply the converted AC voltage to the first and second transformers T1 and T2.

The on and off switchings of the third and fourth switching elements Q3 and Q4 of the synchronous rectifier 21 are operative to convert an AC voltage created in each the first and second transformers T1 and T2 into a DC voltage and to supply the converted DC voltage to the load 3.

The output voltage detecting circuit 35 is placed across the load 3 and operative to cyclically detect an output voltage Vout from the synchronous rectifier 21 via the capacitor C3 and to send, to the controller 33, the detected output voltage Vout or an output current iout based on the output voltage Vout every cycle of detection thereof.

For example, in the embodiment, the controller 33 is operative to execute a PWM (Pulse Width Modulated) control so as to drive the first switching element Q1. Specifically, the controller 33 is operative to turn on and off the first switching element Q1 based on a predetermined duty cycle (on duty) of a PWM signal to thereby regulate the detected output voltage to a predetermined target voltage. Note that a carrier frequency in the PWM control is set within several decades to several hundreds kHz (kilohertz). It is preferable to set the carrier frequency high as much as switching losses and electromagnetic noises are allowable.

As each of the first to fourth switching elements Q1 to Q4, a power MOSFFT having an intrinsic diode is used in the embodiment as an example. As each of the switching elements Q1 to Q4, another switching element, which has parallely-connected junction diode and another transistor, such as IGBT (Insulated Gate Bipolar Transistor) can be used.

The fist transformer T1 includes a first primary winding N1, a second primary winding N2, and a first secondary winding N3. The first transformer T1 has a core (magnetic core) 23a, preferably with a gap; this core 23a is schematically illustrated in FIG. 2.

The first and second primary windings N1 and N2 are separately wound around the core 23a, and the first secondary winding N3 is wound around the core 23a. In hiss structure, the first and second primary windings N1 and N2 are to be electromagnetically coupled (linked) to the first secondary winding N3.

The winding directions of the respective windings N1, N2, and N3 are previously determined, respectively.

The second transformer T2 is composed of a third primary winding N4, a fourth primary winding N5, and a second secondary winding N6. The second transformer T2 has a core (magnetic core) 23b, preferably with a gap; this core 23b is schematically illustrated in FIG. 2.

The third and fourth primary windings N4 and N5 are separately wound around the core 23b, and the second secondary winding N6 is wound around the core 23b. In this structure, the third and fourth primary windings N4 and N5 are to be electromagnetically coupled (linked) to the second secondary winding N6.

The winding directions of the respective windings N4, N5, and N6 are previously determined, respectively.

As illustrated in FIG. 2, a non dot-side end of the first primary winding N1 and a dot-side end of the third primary winding N4 are connected to each other in series, constituting a first colt pair 25. Similarly, a non dot-side end of the second primary winding N2 and a dot-side end of the fourth primary winding N5 are also connected to each other in series, constituting a second coil pair 26.

The configuration in which the first primary winding N1 and the third primary winding N4 are connected to each other in series is specifically designed in the embodiment, so this will be described hereinafter in detail. Similarly, the configuration in which the second primary winding N2 and the fourth primary winding N5 are connected to each other in series is specifically designed in the embodiment, so this will be described hereinafter in detail.

A non dot-side end of the third primary winding N4 and that of the fourth primary winding N5 are connected to each other, constituting a common terminal Tec between the first and second coil pairs 25 and 26. In this embodiment, the non dot-side end of the first primary winding N1 and that of the fourth primary winding N5 can be connected to each other so as to constitute the common terminal Tec.

One end of a lead A1 whose other end is connected to a dot-side end of the first primary winding N1 is connected, as an independent terminal Te2 of the first coil pair 25, to a high-side terminal (positive terminal) of the battery 2.

One end of a lead B1 whose other end is connected to a dot-side end of the second primary winding N2 is connected serves as an independent terminal Te1 of the second coil pair 26.

Note that the dot mark illustrated in the figures adjacent to an end of a winding represents a winding direction thereof (polarity thereof).

The first switching element Q1 establishes a connection between the independent terminal Te1 and a low-side terminal (negative terminal) of the battery 2. The second switching element Q2 and the capacitor C2 are connected to each other in series, allowing the independent terminal Te1 and the common terminal Tec to be connected to each other.

The active clamp circuit 12 is operative to bypass, when the first switching element is turned off, a current flowing through the first switching element Q1 just before the first switching element being turned off.

The capacitor C1 establishes a connection between the independent terminal Te1 and the low-side terminal of the battery 2.

In FIG. 2, the character reference "D1" represents an intrinsic diode of the power MOS transistor as the first switching element Q1, and the character reference "D2" represents an intrinsic diode of the power MOS transistor as the second switching element Q2. In place of the intrinsic diodes, independent diodes can be used.

In the synchronous rectifier 21, a non dot-side terminal of the first secondary winding N3 is connected through a connecting line (portion) 31 to one terminal 3a of the load 3. One terminal of the fourth switching element Q4 is connected to a dot-side terminal of the first secondary winding N3, and the other terminal of the fourth switching element Q4 is connected through a connecting line (portion) 32 to the other terminal 3b of the load 3.

One terminal of the third switching element Q3 is connected to a non dot-side terminal of the second secondary winding N6, and the other terminal of the third switching element Q3 is connected through the connecting line 32 to the other terminal 3b of the load 3.

A dot-side terminal of the second secondary winding N6 is connected through the connecting line 31 to the one terminal 3a of the load 3.

In FIG. 2, the character reference "D3" represents an intrinsic diode of the power MOS transistor as the third switching element Q3, and the character reference "D4" represents an intrinsic diode of the power MOS transistor as the fourth switching element Q4. In place of the intrinsic diodes, independent diodes can be used.

The capacitor C3 serves as a well known output smoothing circuit, which is connected between the connecting lines 31 and 32 in parallel to the load 3 for smoothing the secondary voltages generated in the secondary windings N3 and N6.

The output smoothing circuit can consist of the combination of a choke coil and the capacitor C3.

Each of the first and second switching elements (power MOS transistors) Q1 and Q2 has a control terminal, such as a gate terminal. The gate terminals of the switching elements Q1 and Q2 are connected to the controller 33. In addition, each of the third and fourth switching elements (power MOS transistors) Q3 and Q4 has a control terminal, such as a gate terminal, connected to the controller 33. These connections relationships between each of the first to fourth switching elements Q1 to Q4 and the controller 33 are not illustrated in FIG. 1 because of avoiding FIG. 1 from being complicated.

As described hereinafter, in the embodiment, the controller 33 executes the PWM control to alternately turn on the first and second switches Q1 and Q2, and dead times normally set between each on state of the first switching element Q1 and each on state of the second switching element Q2 can be negligible.

Incidentally, any one of the third and fourth switching elements Q3 and Q4 may be replaced into a diode. The third switching element Q3 has the operating state that is substantially identical with that of the first switching element Q1. Similarly, the fourth switching element Q4 has the operating state that is substantially identical with that of the second switching element Q2.

Figure 3:
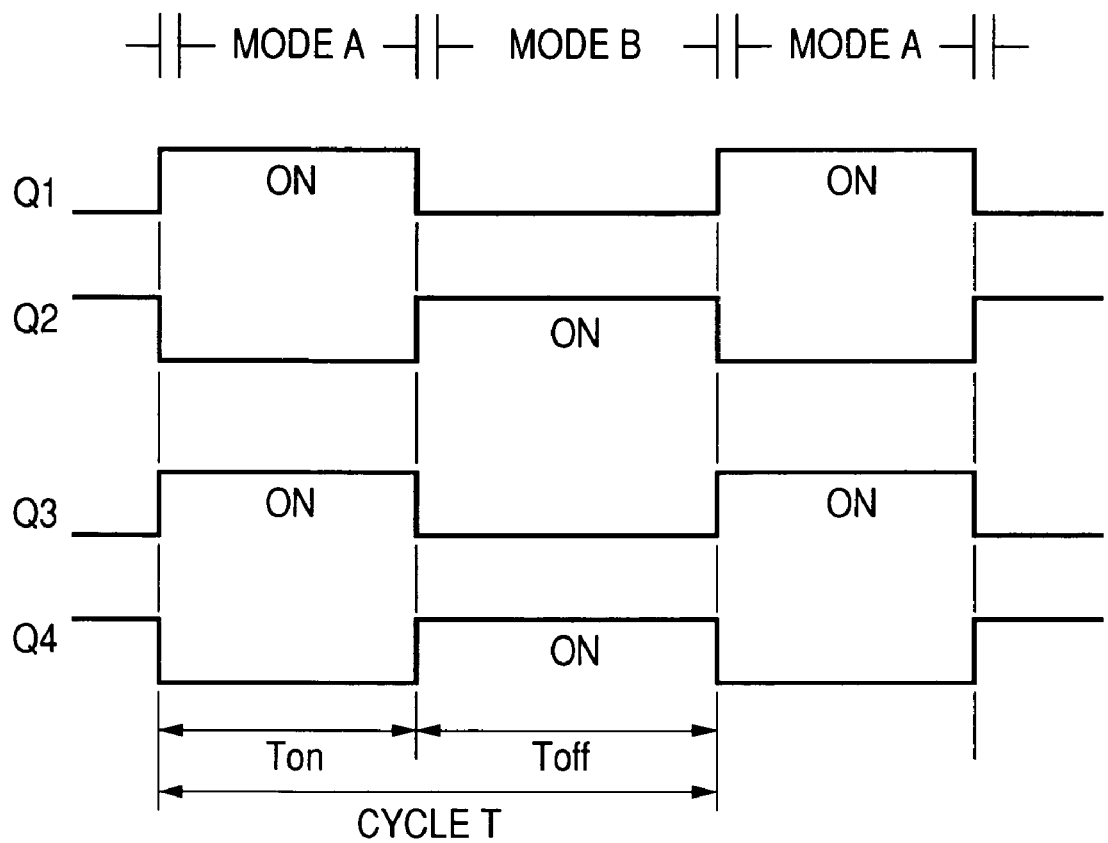
FIG. 3 is a timing chart schematically illustrating operating timings of first to fourth switching elements according to the configuration example of the embodiment of the present invention.

Operating timings of the first to fourth switching elements Q1 to Q4 in the periods of the operating modes A and B, described hereinafter, are illustrated in FIG. 3 as a timing chart.

Figure 4:
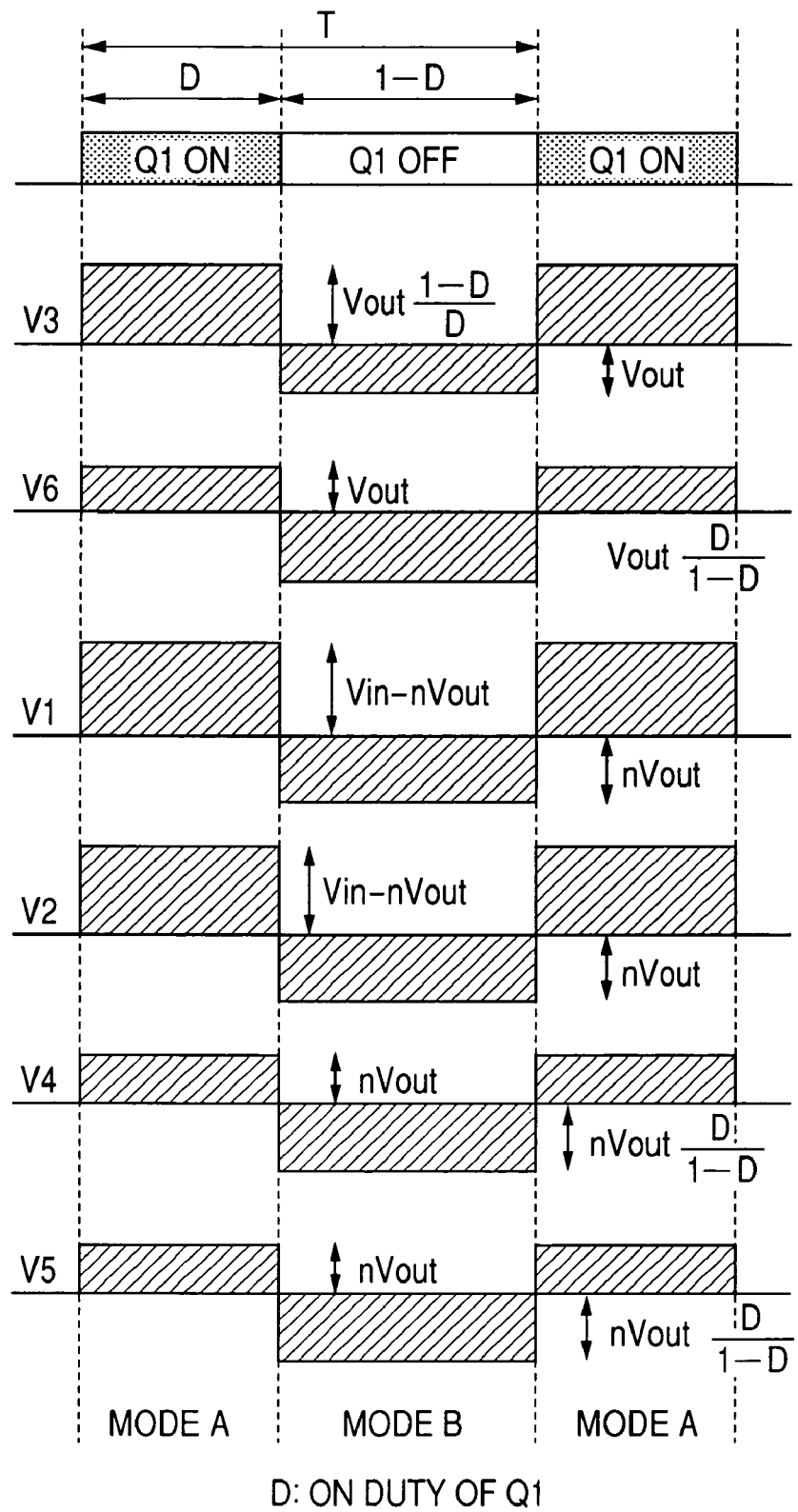
FIG. 4 is a timing chart schematically illustrating transitions of voltages of first and second primary windings, a first secondary winding, third and fourth primary windings, and a second secondary winding in the operating modes A and B according to the configuration example of the embodiment of the present invention.

The transitions of voltages V1 to V6 respectively in the windings N1 to N6 in the operating modes A and B are illustrated in FIG. 4 as a timing chart. Note that dead times between the operation timings of the first and second switching elements Q1 and Q2 are omitted in FIGS. 3 and 4.

Similarly, dead times between the operation timings of the third and fourth switching elements Q3 and Q4 are also omitted in FIGS. 3 and 4.

The reference character 'D' in FIGS. 3 and 4 indicates an on duty (on duty ratio) of the first switching element Q1, which is represented as an equation of "D (on duty of the switching element Q1)=Ton/T". Where the reference character "Ton" indicates on duration of the first switching element Q1, and the reference character "Toff" indicates off duration of the first switching element Q1. The reference character "T" indicates the switching cycle of the first switching element Q1, which is represented as "Ton+Toff".

In the embodiment, numbers of turns of the windings N1 to N6 are set to n1 to n6, respectively. Ratios of the numbers of turns n1 to n6 can be varied. It can be preferable that the ratios n3/n1, n3/n2, n6/n4, and n6/n5 be equal to each other. That is:

$$n3/n1 = n3/n2 = n6/n4 = n6/n5$$

The ratio (n3/n1=n3/n2=n6/n4=n6/n5) is typically represented as "n".

The output voltage Vout, therefore, is given by the following equation according to the previously determined parameters:

$$Vout = n \times D \times Vin$$

In addition, as illustrated in FIG. 3, the controller 33 controls to turn the third switching element Q3 on in synchronization with the turning-on of the first switching element Q1 to thereby rectify a secondary voltage created in the second secondary winding N6 to a DC voltage.

Similarly, the controller 33 controls to turn the fourth switching element Q4 on in synchronization with the turning-on of the second switching element Q4 to thereby rectify a secondary voltage created in the first secondary winding N3 to a DC voltage.

Next, operations of the DC to DC converter 1 will be described hereinafter.

To a current supplied from the battery 2 and inputted to the first primary winding N1 and the third primary winding N4, reference character i1 is assigned. To a current charged in the capacitor C1 and that discharged therefrom, reference character i2 is assigned.

To a current outputted through the first secondary winding N3 to the capacitor C3, reference character i4 is assigned. To a current outputted through the second secondary winding N6 to the capacitor C3, reference character i3 is assigned.

Figure 5:
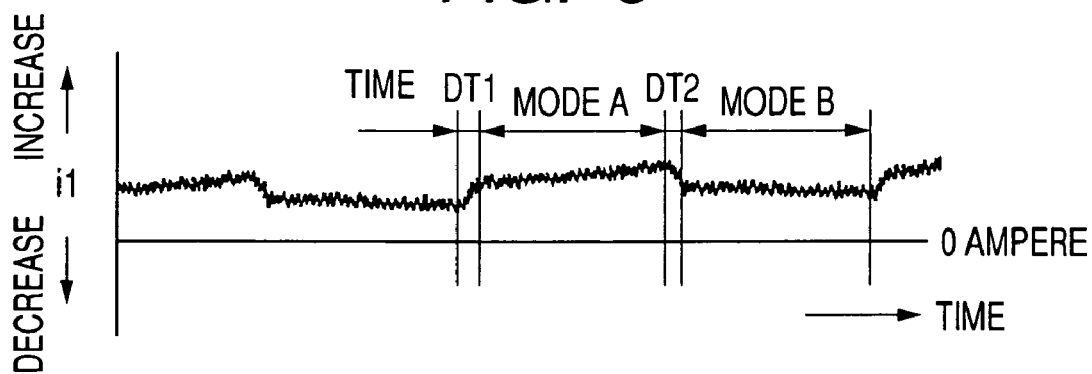
FIG. 5 is a graph schematically illustrating, over time, a current i1 supplied from a battery according to the configuration example of the embodiment of the present invention.
Figure 6:
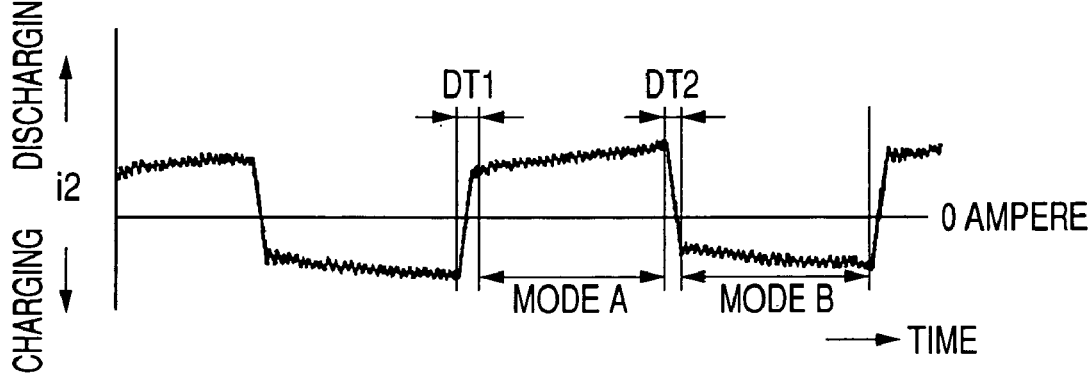
FIG. 6 is a graph schematically illustrating, over tune, a current i2 to be charged in a capacitor C1 illustrated in FIG. 2 and to be discharged therefrom according to the configuration example of the embodiment of the present invention.
Figure 7:
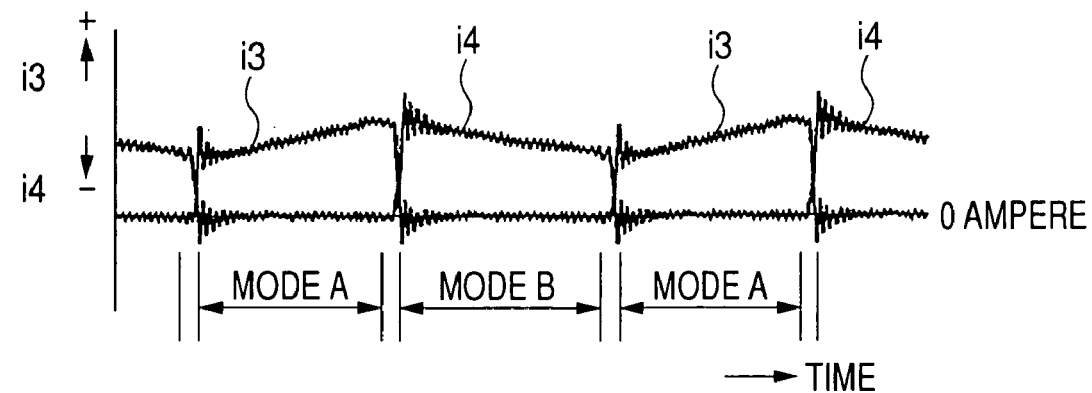
FIG. 7 is a graph schematically illustrating, over time, currents i3 and i4 to be outputted through a second secondary winding and a first secondary windings respectively, according to the configuration example of the embodiment of the present invention.

FIG. 5 illustrates the waveform of the actually measured current i1 described hereinafter, FIG. 6 illustrates the waveform of the actually measured current i2 described hereinafter, and FIG. 7 illustrates the waveforms of the actually measured currents i3 and i4 described hereinafter.

Figure 8:
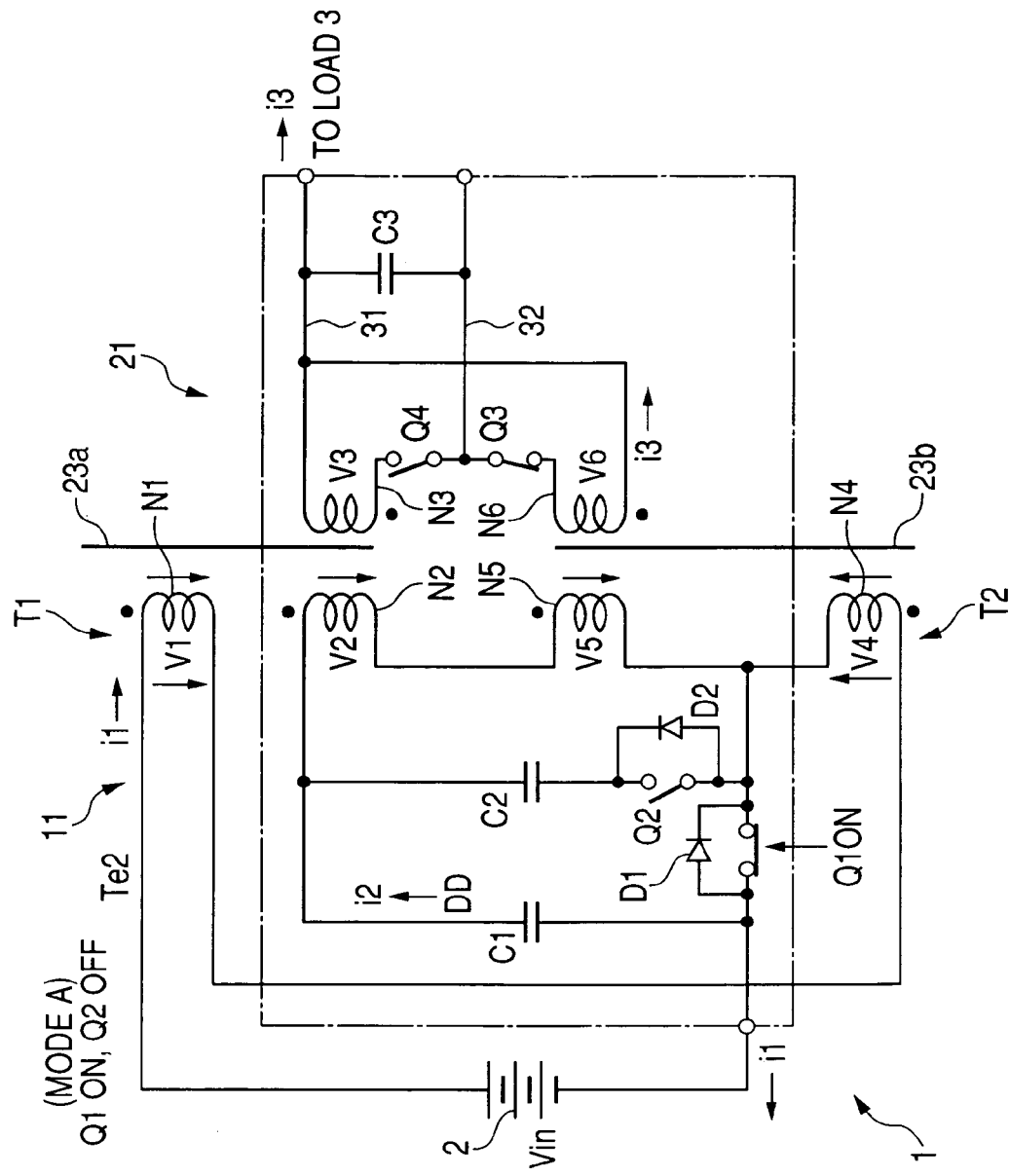
FIG. 8 is a circuit diagram schematically illustrating an equivalent circuit of the DC to DC converter illustrated in FIG. 2 while the first switching element is in on state in an operating mode A (the second switching element is in off state)

In addition, FIG. 8 illustrates an equivalent circuit of the DC to DC converter 1 illustrated in FIG. 1 while the first switching element Q1 is in on state (the second switching element Q2 is off state).

Figure 9:
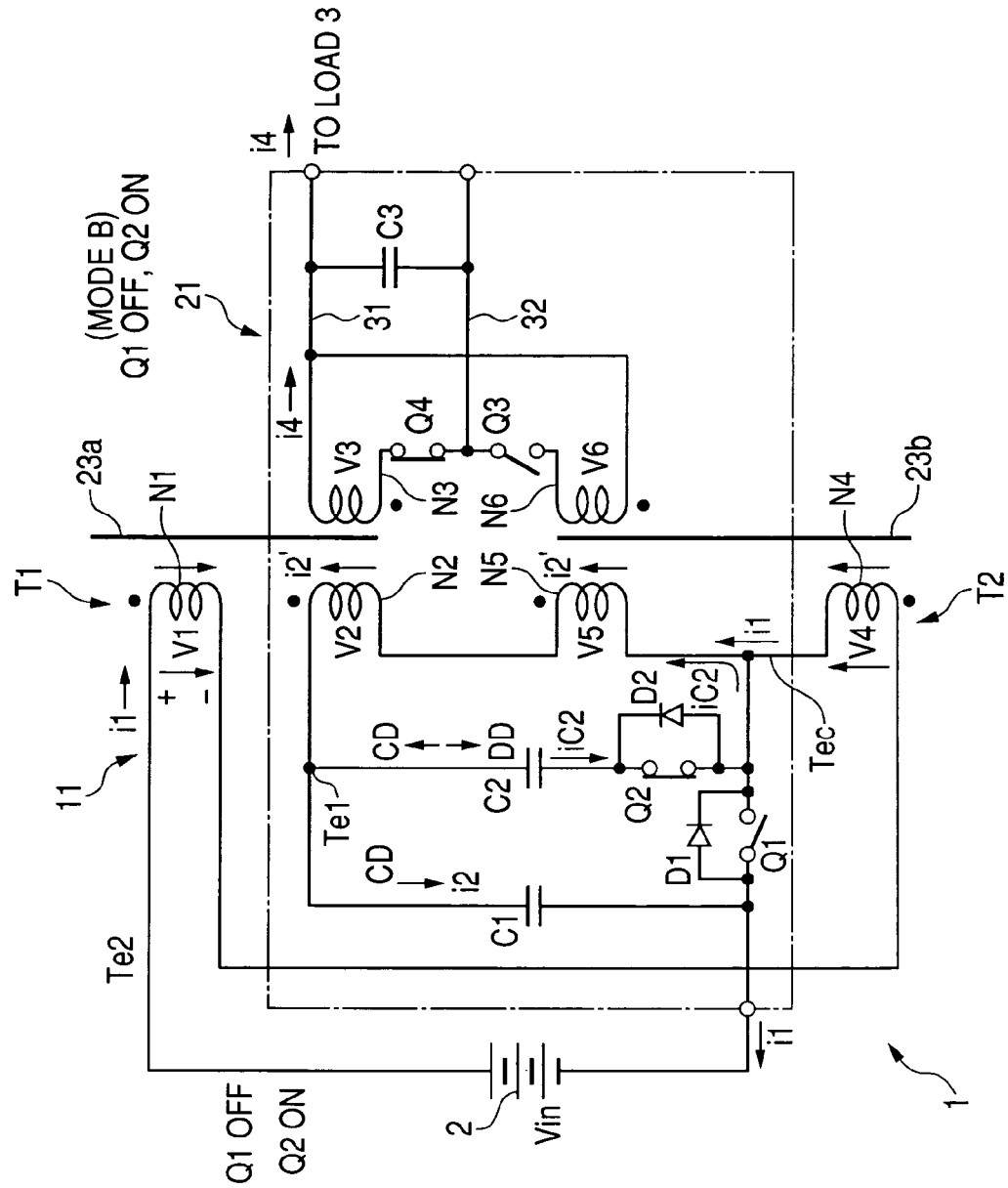
FIG. 9 is a circuit diagram schematically illustrating an equivalent circuit of the DC to DC converter illustrated in FIG. 2 while the second switching element is in on state in an operating mode B (the first switching element is in off state)

FIG. 9 illustrates an equivalent circuit of the DC to DC converter 1 illustrated in FIG. 1 while the second switching element Q2 is in on state (the first switching element Q1 is off state).

In FIGS. 8 and 9, the configuration in which the first primary winding N1 and the third primary winding N4 are connected to each other in series is identical to that illustrated in FIG. 2. In FIGS. 8 and 9, for the sake of simplification, the series-connected configuration of the first and third primary windings N1 and N4 is simply illustrated as compared with that illustrated in FIG. 2.

Similarly, in FIGS. 8 and 9, the configuration in which the second primary winding N2 and the fourth primary winding N5 are connected to each other in series is identical to that illustrated in FIG. 2. In FIGS. 8 and 9 for the sake of simplification, the series-connected configuration of the second and fourth primary windings N2 and N5 is simply illustrated as compared with that illustrated in FIG. 2.

The charging directions CD to the capacitors C1 and C2 are illustrated in FIGS. 8 and 9, and the discharging directions DD from the capacitors C1 and C2 are illustrated in FIGS. 8 and 9. In FIG. 7, the current i3 flowing through the second secondary winding N6 of the second transformer T2 and the current i4 flowing through the first secondary winding N3 of the first transformer T1 are illustrated together.

In the operating mode A, the current i4 is assumed to substantially zero, and, in the operating mode B, the current i3 is assumed to substantially zero.

Each of the first to fourth switching elements Q1 to Q4 actually rises from the off state to the on state with a predetermined rise time, and falls from the on state to the off state with a predetermined fall time.

As shown in FIG. 3, the first and third switching elements Q1 and Q3 are substantially synchronously turned on and off by the control of the controller 33, and the second and fourth switching elements Q2 and Q4 are substantially synchronously turned on and off by the control of the controller 33.

Note that the synchronous turning-on may include in a case where the third switching element (fourth switching element) is turned on after a predetermined time has elapsed since the turning on of the first switching element (the fourth switching element).

In addition, the first and second switching elements Q1 and Q2 are substantially complementarily turned on and off by the control of the controller 33, and the third and fourth switching elements Q3 and Q4 are substantially complementarily turned on and off by the control of the controller 33.

As illustrated in FIG. 3, the controller 33 keeps the first and third switching elements Q1 and Q3 on state during the mode A period, and keeps the second and fourth switching elements Q2 and Q4 on state during the mode B period.

Operations of the DC to DC converter 1 in one cycle (the modes A and B) will be sequentially described hereinafter.

Incidentally, for simplifying the explanations, the number of turns of each of the windings N1 to N6 of the first and second transformers T1 and T2 is set to the same value so that magnetomotive forces generated in the windings N1 to N6 are substantially identical with each other. The magnetic resistances of the first and second transformers T1 and T2 are substantially identical with each other. In each of the windings N1 to N6, an element corresponding to leakage inductance of each winding would be connected to each winding. The leakage inductance, however, is negligible in the explanations hereinafter.

The operations of the DC to DC converter 1 in the one cycle (the modes A and B), under steady state condition are explained.

The operations of the DC to DC converter 1 in the one cycle are explained in accordance with FIGS. 2 to 8. Incidentally, because it is assumed that the number of turns of each of the windings N1 to N6 is set to 1, reference characters of Him (m: natural number) are used to indicative of the magnetomotive forces (ampere-turns) of respective windings N1 to N6, respectively. For example, the magnetomotive forces generated in the windings N1 to N6 are represented as "ampere-turns" (Hi1 to Hi6), respectively. Each of the magnetomotive forces (ampere-turn) of a corresponding one winding has positive or negative sign depending on the direction of the magnetic flux generated in the corresponding one winding.

Dead Time Before the Operations of the Converter 1 in the Mode A

Before the first switching element Q is turned on, that is, when the first switching element Q1 is off state and the second switching element Q2 is in on state, a current flows from the capacitor C2 through the fourth primary winging N5 and the second primary winding N2 into the capacitor C1. The current flowing into the capacitor C1 is charged therein as electric energy as described hereinafter.

While the first switching element Q1 is off state with the second switching element Q2 being off state, that is, while the DC to DC converter 1 is in the dead time DT1 (see FIG. 5), the leakage inductance of the primary windings N2 and N5 and the output capacitance across the first switching element Q1 provide an LC circuit. The leakage inductance and the output capacitance, therefore, resonate with each other.

In the LC circuit, the energy of the leakage inductance causes a resonance current to flow from the output capacitance, which reduces the voltage across the first switching element Q1.

While the voltage across the first switching element Q1 is substantially zero, the controller 4 controls the first switching element Q1 to be turned on (see FIGS. 3 and 4). This realizes the "soft-switching (zero-voltage switching)" of the first switching element Q1, thereby reducing switching loss and noises of the first switching element Q1.

Operations of the Converter 1 in the Operating Mode A

While the first switching element Q1 is in on state with the second switching element Q2 being off state based on control of the controller 33, the current i1 supplied from the battery 2 reverses the direction toward the capacitor C1 via the windings N5 and N2 in the previous operating mode B so as to pass through the first primary winding N1, the third primary winding N4, and the first switching element Q1 toward the low-side terminal of the battery 2 (see FIG. 8).

This allows the current i1 to increase with time (see FIG. 5).

On the other hand, electric energy stored in the capacitor C1 for the previous mode B period by the battery 2 causes the capacitor C1 to have a potential higher than an average voltage Vin of the battery 2.

In the operating mode A (first switching element Q1 is in on state), therefore, the current i2 discharged from the capacitor C1 also flows through the second primary winding N2, the fourth primary winding N5, and the first switching element Q1 toward the low-side terminal of the battery 2 (see FIG. 8).

This allows the current i2 to increase with time (see FIG. 6).

Voltages V1, V2, V4, and V5 are generated in the primary windings N1, N2, N4, and N5, respectively.

Specifically, as illustrated in FIG. 4, the voltage V1 is represented as "Vin−nVout", the voltage V2 is represented as "Vin−nVout", the voltage V4 is represented as "nVout", and the voltage V5 is represented as "nVout".

In the second transformer T2, the third primary winding N4 in which the current i1 flows generates a magnetomotive force (ampere-turn) Hi1 and the fourth primary winding N5 in which the current i2 flows generates a magnetomotive force (ampere-turn) Hi2. In the embodiment, the polarities, the numbers of turns and the winding directions of the third primary winding N4 and the fourth primary winding N5 are adjusted so that the direction of the magnetic flux formed by the magnetomotive force Hi1 in the third primary winding N4 and that of the flux formed by the magnetomotive force Hi2 in the fourth primary winding N5 coincide with each other.

The increase in each of the currents i1 and i2 allows a substantially linear increase in a magnetic flux $\phi 2$ corresponding to the sum of the magnetomotive forces (Hi1+Hi2) generated in the core 23b of the transformer T2.

The substantially linear increase in the magnetic flux $\phi 2$ induces a substantially DC voltage (secondary voltage) V6 in the second secondary winging N6. The secondary voltage V6 corresponds to the output voltage Vout in the mode A.

At that time, the third switching element Q3 is in on state and the fourth switching element Q4 is off state, so that the secondary winding side of the first transformer T1 is opened. This allows the energized windings N1 and N2 to serve as choke coils.

Accordingly, because, in the embodiment, the winding direction of the second secondary winding N6 is adjusted, the induced secondary voltage V6 allows a substantially galvanic current i3 to be generated therethrough.

Specifically, the increase in the magnetomotive force due to increase in the current i1 flowing through the third primary winding N4 and that in the magnetomotive force due to increase in the current i2 flowing through the fourth primary winding N5 of the second transformer T2 are combined to form a combined magnetomotive force within the on duration of the first switching element Q1 in the mode A.

The combined magnetomotive force causes the secondary voltage V6 to be generated in the second secondary winding N6 so that the substantially galvanic current i3 is outputted from the second secondary winding N6 (see FIG. 7).

In other words, the increase in the magnetic flux based on the increase in the current i1 through the third primary winding N4 and that in the magnetic flux based on the increase in the current i2 through the fourth winding N5 cause the substantially galvanic current i3 to be outputted from the second secondary winding N6.

On the other hand, as described above, because the currents i1 and i2 flow through the energized windings N1 and N2 while the fourth switching element Q4 is off state, the energized windings N1 and N2 serve as choke coils. Thus, for the mode A period, magnetic energy generated in the first transformer T1 has been stored therein.

The choke functions (reactor operations) of the windings N1 and N2 allow the state of the magnetic flux therein changed by the transformer operation of the first transformer T1 during the previous mode B period to be returned to its original state of magnetic flux (the beginning of the previous mode B period).

At the Off Timing of the First Switching Element Q1

When the first switching element Q1 is turned off, if no active clamp circuit 12 is provided in the inverter circuit 11, the energy stored in both magnetized and leakage inductances of each of the primary windings would have nowhere to flow, causing an infinite spike voltage (surge voltage) to occur across the first switching element Q1.

The active clamp circuit 12, however, allows the energy to flow its capacitor C2 so that the energy is charged in the capacitor C2, making it possible to avoid surge voltage.

Dead Time Before the Operations of the Converter 1 in the Mode B

Before the second switching element Q2 is turned on, that is, when the second switching element Q2 is off state and the first switching element Q1 is off state, the charge of the energy into the capacitor C2 causes the voltage across the first switching element Q1 to increase. The increased voltage across the first switching element Q1 is larger than the input voltage Vin.

Note that the maximum of the voltage across the first switching element Q1 is represented as the following equation:

$$V\max(Q1) = V\text{in}/(1-D) + a$$

Where "Vmax(Q1)" represents the voltage across the first switching element Q1, and "a" represents voltage variations due to the fluctuations of the load 3, heat loss and/or parasitic components.

At that time, the surge voltages due to the inductance components of the primary windings cause the capacitor C2 to be charged through the intrinsic diode D2 thereof. Because the first and second switching elements Q1 and Q2 are off state, the energy components of both magnetized and leakage inductances of the first to fourth primary windings N1, N2, N4, and N5 cause the currents i1 and i2 to decrease within a dead time DT2 (see FIGS. 5 and 6). That is, the waveforms of the current i1 and i2 are ramped in the dead time DT2 in a direction opposite to the currents i1 and i2 in the dead time DT1.

Operations of the Converter 1 in the Operating Mode B

When the second switching element Q2 is turned on with the first switching element Q1 being off state based on control of the controller 33, the current i1 supplied from the battery 2 passes through the first, third and fourth primary windings N1, N4, and N5, and the second primary winding N2 into the capacitor C1 to be charged as a current i2' therein.

On the other hand, because the electric energy stored in the capacitor C2 causes the capacitor C2 to have the potential higher than the potential at a line connecting between the common terminal Tec and the low-side terminal of the battery 2 corresponding to the Vmax(Q1) of the first switching element Q1.

In the mode B, therefore, a current iC2 discharged from the capacitor C2 also flows through the second switching element Q2, the fourth primary winding N5, and the second primary winding N2.

Voltages V1, V2, V4, and V5 are generated in the primary windings N1, N2, N4, and N5, respectively.

Specifically, as shown in FIG. 4, the voltage V1 is represented as "nVout", the voltage V2 is represented as "nVout", the voltage V4 is represented as "nVout(1−D)/D", and the voltage V5 is represented as "nVoutD/(1−D)".

In the first transformer T1, the decrease in the current i1 flowing into the first primary winding N1 by the turning off of the first switching element Q1 causes the magnetic flux generated in the winding N1 in a predetermined direction to substantially linearly change. The current difference in the second primary winding N2 from the current i2 in the mode A to the current i2' reverse in direction from the current i2 in the mode B contributes the substantially linear decrease in the magnetic flux generated in the predetermined direction.

The substantially linear change in the magnetic flux in each of the windings N1 and N2 induces a substantially DC voltage (secondary voltage) V3 in the first secondary winging N3. The secondary voltage V3 corresponds to the output voltage Vout in the mode B.

In the mode B, the third switching element Q4 is off state and the fourth switching element Q5 is in on state, so that the secondary winding side of the second transformer T2 is opened.

In the embodiment, the winding direction of the first secondary winding N3 is determined so that the secondary voltage V3 outputs the current i4 through the load 3.

Specifically, the linear change in the magnetic flux due to change in the current i1 flowing through the first primary winding N1 and that in the magnetic flux due to change in the current flowing trough the second primary winding N2 of the second transformer T2 are combined to form a combined magnetomotive force within the on duration of the second switching element Q2 in the mode B.

The combined magnetomotive force causes the secondary voltage V3 to be generated in the first secondary winding N3 so that the substantially galvanic current i4 is outputted from the first secondary winding N3 (see FIG. 7).

On the other hand, as described above, because the currents i1 and i2' flow rough the energized windings N4 and N5 while the third switching element Q3 is off state, the energized windings N4 and N5 serve as choke coils. Thus, for the mode B period, magnetic energy generated in the second transformer T2 has been stored therein.

The choke functions (reactor operations) of the windings N4 and N5 allow the state of the magnetic flux therein changed by the transformer operation of the second transformer T2 during the previous mode A period to be returned to its original state of magnetic flux (the beginning of the previous mode A period).

Figure 10:
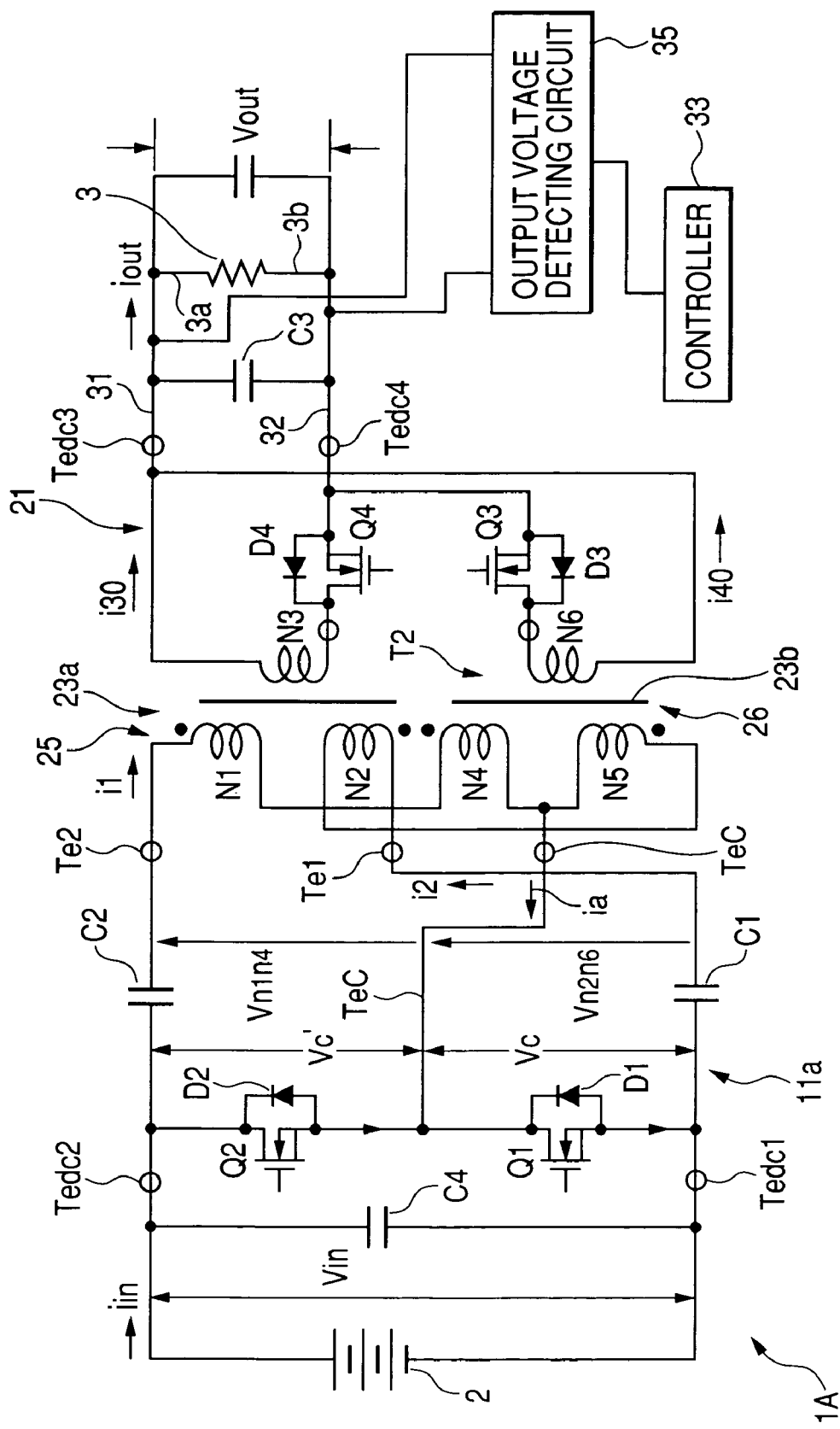
FIG. 10 is a circuit diagram schematically illustrating another configuration example of the DC to DC converter illustrated in FIG. 1.

Next, a DC to DC converter with another configuration example of the DC to DC converter 1A is illustrated in FIG. 10.

In the DC to DC converter 1A, the structure of an inverter circuit 11a illustrated in FIG. 10 is different from that of the inverter circuit 11 illustrated in FIG. 2. Like parts between the DC to DC converters 1 and 1A, to which like reference characters are assigned, are omitted or simplified in description.

As the load 3, a low-voltage battery is provided. Specifically, the DC to DC converter 1A illustrated in FIG. 10 is designed to receive an input DC voltage Vin supplied from the high-voltage battery 2, to generate an output DC voltage Vout lower an level than the input DC voltage Vin, and to charge the output DC voltage Vout into the low-voltage battery 3.

In FIG. 10, the configuration in which the first primary winding N1 and the third primary winding N4 are connected to each other in series is identical to that illustrated in FIG. 2. In FIG. 10, like FIGS. 8 and 9, for the sake Of simplification, the series-connected configuration of the first and third primary windings N1 and N4 is simply illustrated as compared with that illustrated in FIG. 2.

Similarly, in FIG. 10, the configuration in which the second primary winding N2 and the fourth primary winding N5 are connected to each other in series is identical to that illustrated in FIG. 2. In FIG. 10, like FIGS. 8 and 9, for the sake of simplification, the series-connected configuration of the second and fourth primary windings N2 and N5 is simply illustrated as compared with that illustrated in FIG. 2.

As described above, the series-connected configuration of the first and third primary windings N1 and N4 and that of the second and fourth primary windings N2 and N5 are specifically designed in the embodiment, so these series-connected configurations will be described hereinafter in detail.

The inverter circuit 11a illustrated in FIG. 10, as compared with the inverter circuit 11 illustrated in FIG. 2, is specifically designed such that a connecting location between the second switching element Q2 and the capacitor C2 is changed.

Specifically, in FIG. 10, the first switching element Q1 is arranged to connect between the common terminal Tec and a low-side terminal (negative terminal) Tedc1 of the high-voltage battery 2.

The second switching element Q2 is arranged to connect between a high-side terminal (positive terminal) Tedc2 of the high-voltage battery 2 and the common terminal Tec between the first and second coil pairs 25 and 26. The controller 33 controls to complementarily turn the first and second switching elements Q1 and Q2 on and off every predetermined cycle.

The capacitor C1 is arranged to connect between the independent terminal Te1 and the low-side terminal Tedc1 of the high-voltage battery 2.

The capacitor C2 is arranged to connect between the high-side terminal Tedc2 of the high-voltage battery 2 and the independent terminal Te2 of the first primary winding N1.

The inverter circuit 11a is provided with a capacitor C4 connected between the high-side and low-side terminals Tedc2 and Tedc1 of the high-voltage battery 2 in parallel thereto. The capacitor C4 is operative to smooth the input DC voltage Vin and/or an input current $i_{in}$ supplied from the high-voltage battery 2 so as to reduce ripples contained therein.

The third and fourth switching circuits Q3 and Q4 serve as a synchronous rectifier.

Specifically, the controller 33 controls to turn the third switching element Q3 on in synchronization with the turning-on of the first switching element Q1 to thereby rectify a secondary voltage created in the second secondary winding N6 to a DC voltage.

Similarly, the controller 33 controls to turn the fourth switching element Q4 on in synchronization with the turning-on of the second switching element Q4 to thereby rectify a secondary voltage created in the first secondary winding N3 to a DC voltage.

The capacitor C3 is connected between a high-side terminal Tedc3 located on the connecting line 31 connected to a positive terminal 3a of the low-voltage battery 3 and a low-side terminal Tedc4 located on the connecting line 32 connected to a negative terminal 3b thereof. The capacitor C3 serves as an output smoothing circuit operative to smooth the secondary voltages generated in the secondary windings N3 and N6.

Next, operations of the DC to DC converter 1A will be described hereinafter.

The complementary operations of the third and fourth switching elements Q3 and Q4 allow the first and second transformers T1 and T2 to alternately execute a transformer operation and a choke-coil (reactor) operation.

Specifically, during an on-duration of the first switching element Q1, the first transformer T1 and the second transformer T2 serve as an inductor and a transformer, respectively. Strictly speaking, during an on-duration of the first switching element Q1, transformer actions are created between the first and second primary windings N1 and N2.

In contrast, during an on-duration of the second switching element Q2, the second transformer T2 and the first transformer T1 serve as an inductor and a transformer, respectively. Strictly speaking, during an on-duration of the second switching element Q2, transformer actions are created between the third and fourth primary windings N4 and N5.

When one of the first and second transformers T1 and T2 executes the choke-coil (reactor) operation in a current operating mode, the one of the first and second transformers T1 and T2 works to:

return the state of the magnetic flux changed by the transformer operation during the previous operating mode to its original state of magnetic flux; and store magnetic energy created in the one of the first and second transformers T1 and T2.

When the state of the magnetic flux changed by the transformer operation during the previous operating mode is returned to its original state of magnetic flux, the magnetic energy stored in the primary windings of the one of the first and second transformers T1 and T2 is transferred to the corresponding secondary winding in the other of the first and second transformers T1 and T2 that executes the transformer operation.

The magnetic energy stored in a primary winding of the one of the first and second transformers T1 and T2 is also used to charge and/or discharge the capacitor C1 or capacitor C2 of the inverter circuit 11a. The magnetic energy stored in a primary winding of the one of the first and second transformers T1 and T2 is further used to regenerate power to be supplied to the high-voltage battery 2.

In input-output currents for the inverter circuit 11a, let us focus attention on a current i1 flowing via the independent terminal Te2 of the first coil pair 25 thereinto, a current i2 flowing via the independent terminal Te1 of the second coil pair 26 thereinto, and a current ia flowing out of the common terminal TeC in order to describe the operations of the inverter circuit 11a. These currents i1, i2, and ia can also reversely flow. The current ia represents the sum of the current i1 and i2.

Current components flowing between the common terminal TeC and each of the independent terminals Te1 and Te2 consist of a current component to be caused to flow in an inductance therebetween referred to as "inductance current component", and a current component to be transferred to a corresponding secondary side by electromagnetic induction. A voltage between the common terminal TeC and each of the independent terminals Te1 and Te2 is taken as a potential drop between the common terminal TeC and each of the independent terminals Te1 and Te2 by an inductance therebetween.

Because the current i1 is supplied to the first coil pair 25 via the capacitor C2, a potential drop appears across the capacitor C2 in proportional to an integration value of the current i1. Similarly, because the current i2 is supplied to the second coil pair 26 via the capacitor C1, a potential drop appears across the capacitor C1 due to the flow of the current i2 in proportional to an integration value of the current I2.

The potential drop appearing across the capacitor C2 allows the flow of the current i1 to be reduced or stopped, and, similarly, the potential drop appearing across the capacitor C1 allows the flow of the current i2 to be reduced or stopped, which allows the flow of the current ia, equal to the sum of the current i1 and current i2, to be reduced or stopped.

Because the current ia is configured to flow through the first switching element Q1 or the second switching element Q2, turning-off of the first switching element Q1 or second switching element Q2 during the flow of the current ia being reduced or stopped establishes the "soft-switching (zero-volt switching)" thereof. This makes it possible to reduce switching loss (transition loss) of the first switching element Q1 or second switching element Q2.

Next, first to sixth operating modes of the converter 1A defined by respective operating states of the first and second switching elements Q1 and Q2 will be described sequentially hereinafter.

Operations of the Converter 1A in the First Operating Mode

Figure 11:
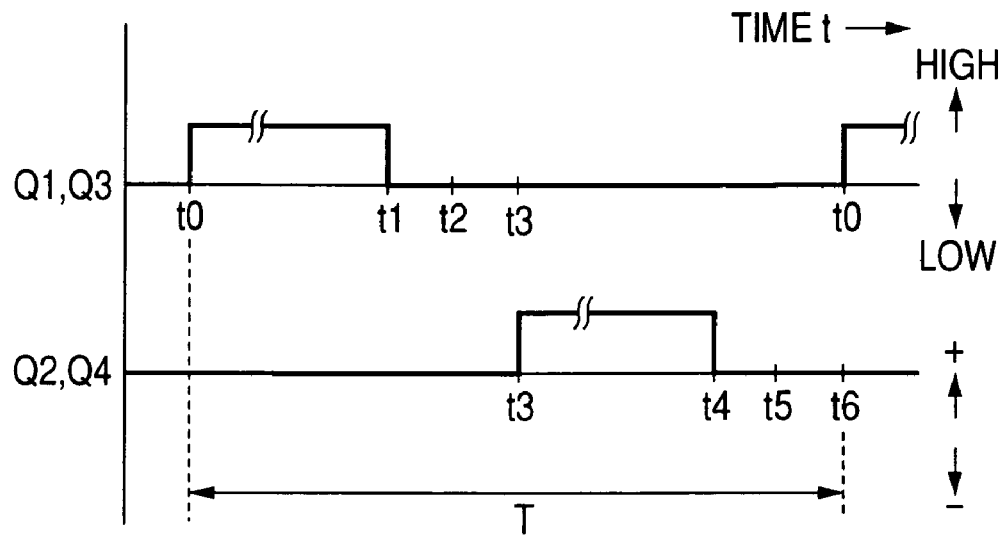
FIG. 11 is a timing chart schematically illustrating operating timings of first to fourth switching elements in first to sixth modes according to another configuration example of the embodiment of the present invention.

FIG. 11 illustrates a timing chart schematically illustrating switching timings of each of the first to fourth switching elements Q1 to Q4 and dead times.

FIGS. 12 to 17 illustrate operations of the DC to DC converter 1A in the first to sixth modes, respectively.

Figure 18:
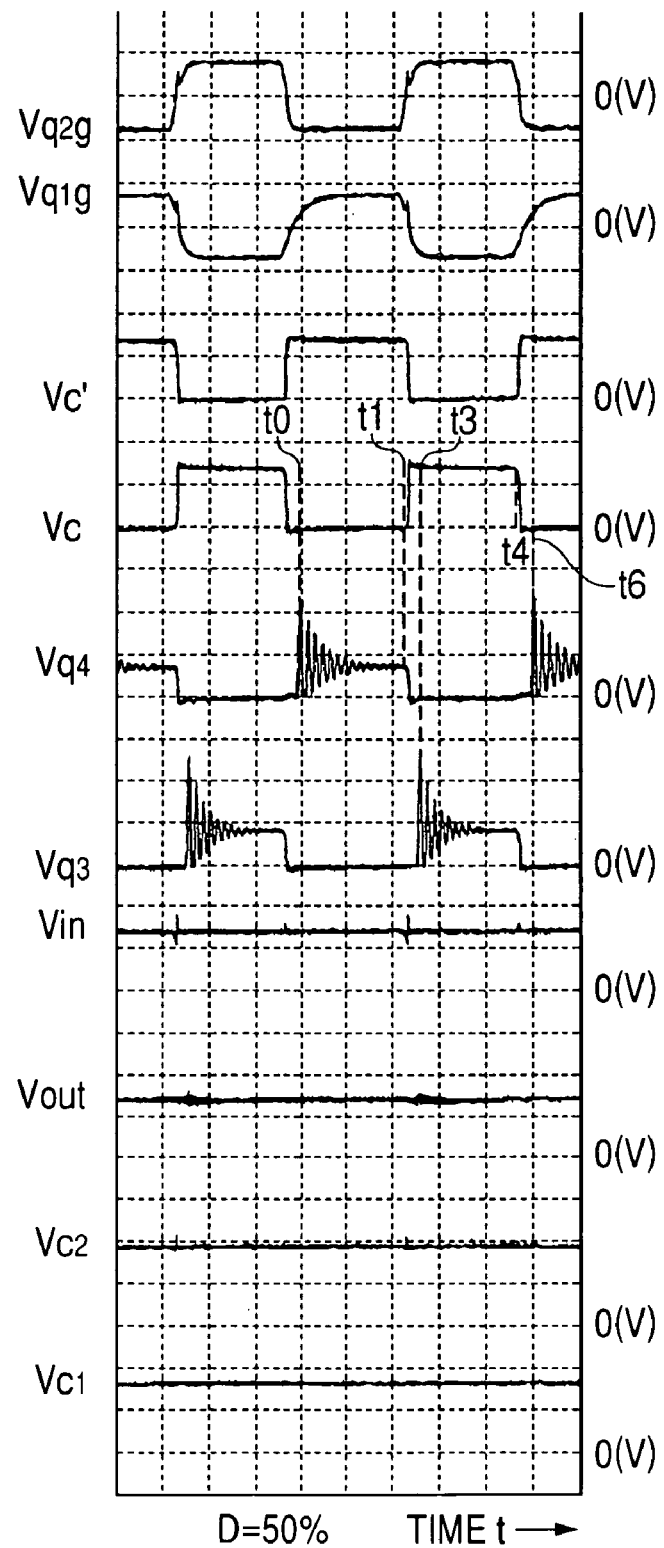
FIG. 18 is a waveform diagram schematically illustrating waveforms of voltages at predetermined portions of the DC to DC converter illustrated in FIG. 10; these waveforms of voltages have been previously measured during the DC to DC converter illustrated in FIG. 10 being tested when the on duty of the first switching element is set to 50%.
Figure 19:
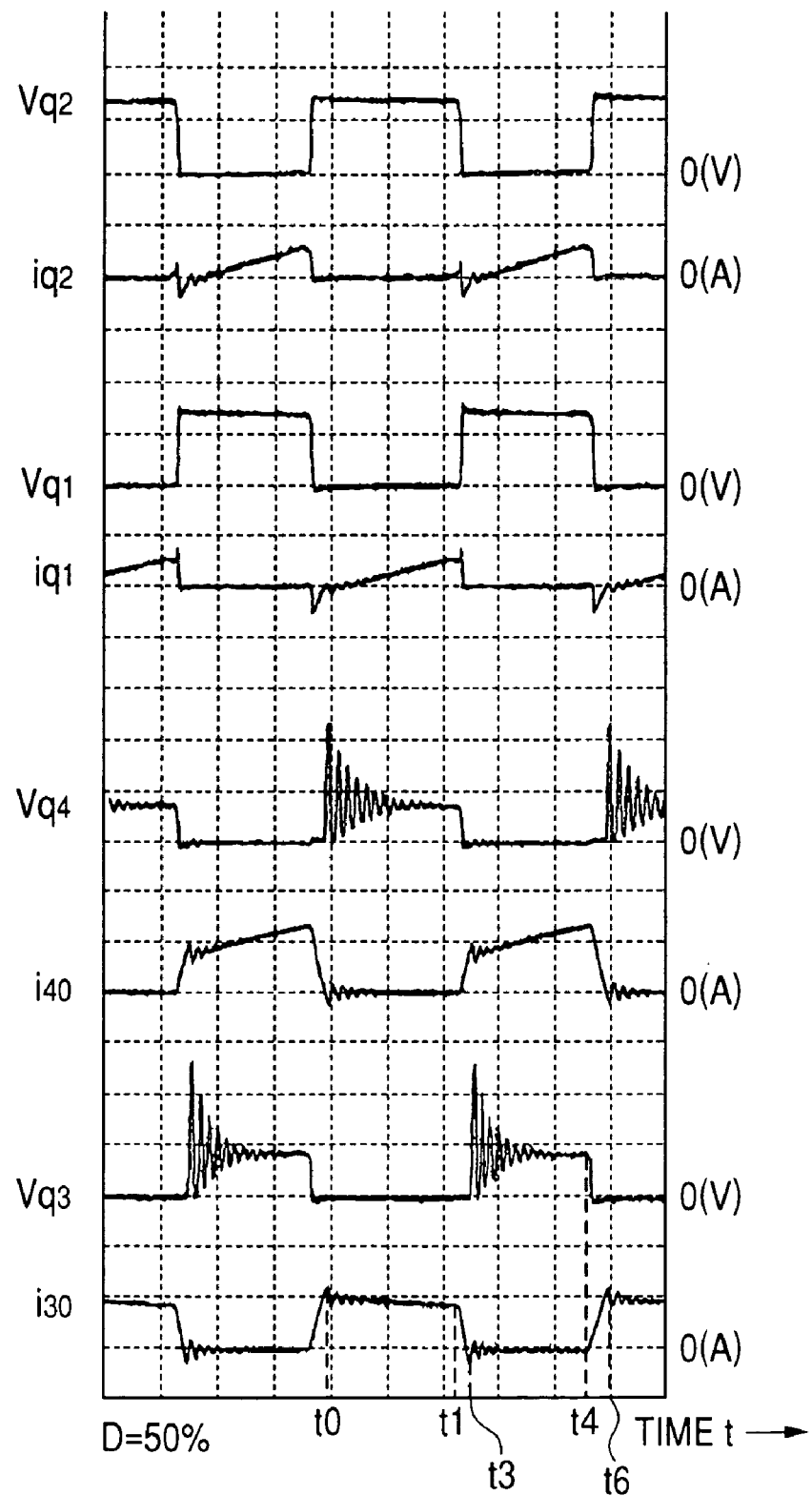
FIG. 19 is a waveform diagram schematically illustrating waveforms of voltages and currents at predetermined portions of the DC to DC converter illustrated in FIG. 10; these waveforms of voltages and currents have been previously measured during the DC to DC converter illustrated in FIG. 10 being tested when the on duty of the first switching element is set to 50%.
Figure 20:
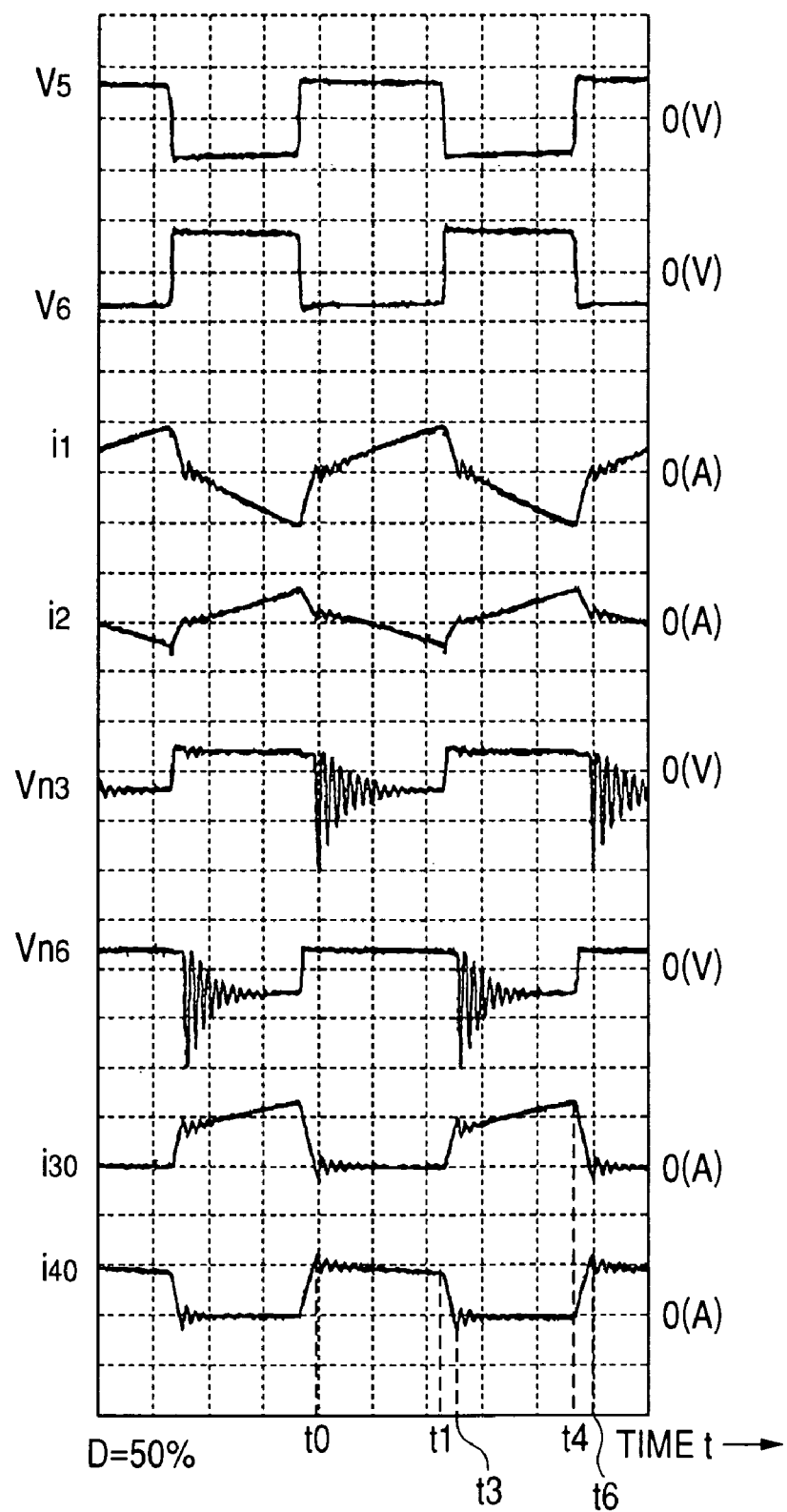
FIG. 20 is a waveform diagram schematically illustrating waveforms of voltages and currents at predetermined portions of the DC to DC converter illustrated in FIG. 10; these waveforms of voltages and currents have been previously measured during the DC to DC converter illustrated in FIG. 10 being tested when the on duty of the first switching element is set to 50%.

FIGS. 18 to 20 schematically illustrate timing charts schematically illustrating waveforms of voltages at predetermined portions of the DC to DC converter 1A and those of currents at predetermined positions thereof when the on duty D of the first switching element Q1 (third switching element Q3) is set to 50 percent; these voltages and currents have been previously measured during the DC to DC converter 1A being tested on conditions that the input voltage Vin is set to approximately 70 volts, and the output current iout is set to approximately 5 amperes.

When each of the first and third switching elements Q1 and Q3 is turned on at a time t0 with the second and fourth switching elements Q2 and Q4 being in off state based on control of the controller 33 (see FIGS. 11, 12, and 20), the DC to DC converter 1A starts to operate in the first operating mode corresponding to the mode A. The time t0 represents a start time of one switching cycle T.

Figure 12:
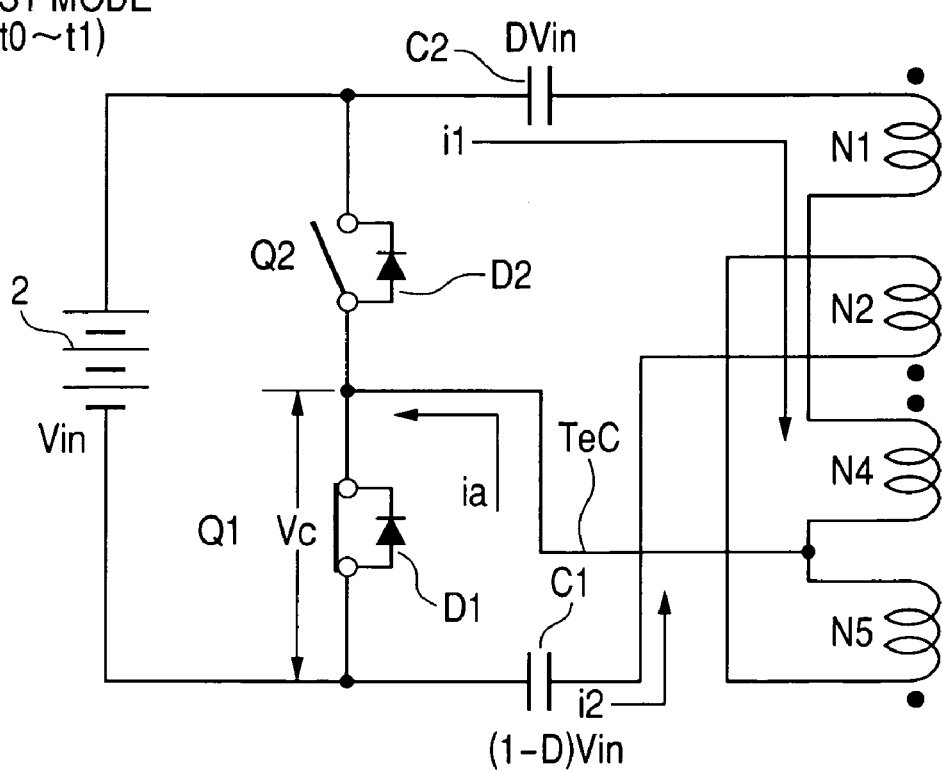
FIG. 12 is a circuit diagram schematically illustrating an equivalent circuit of the DC to DC converter illustrated in FIG. 10 and operating in the first mode.
Figure 13:
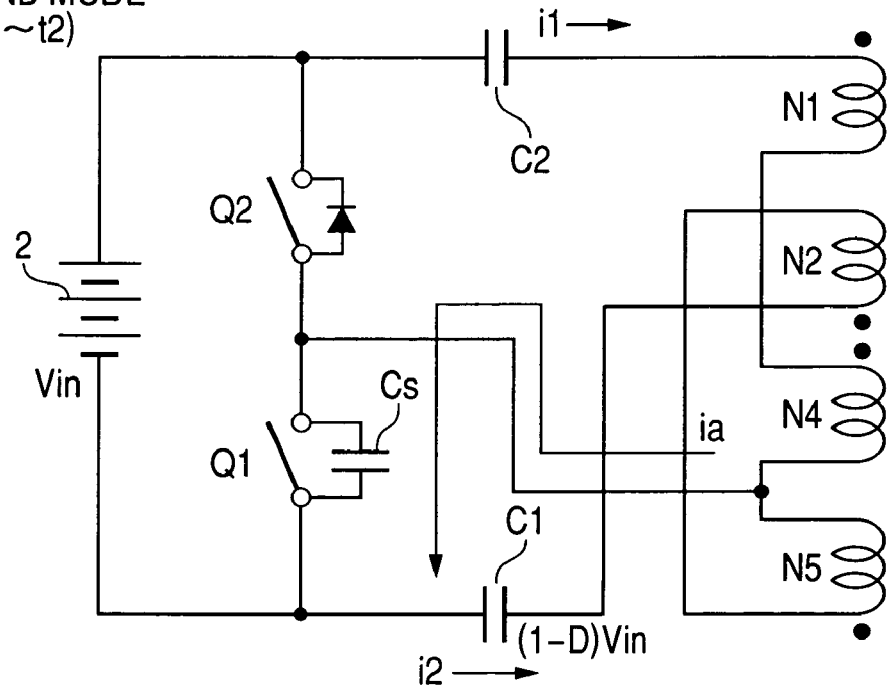
FIG. 13 is a circuit diagram schematically illustrating an equivalent circuit of the DC to DC converter illustrated in FIG. 10 and operating in the second mode.
Figure 14:
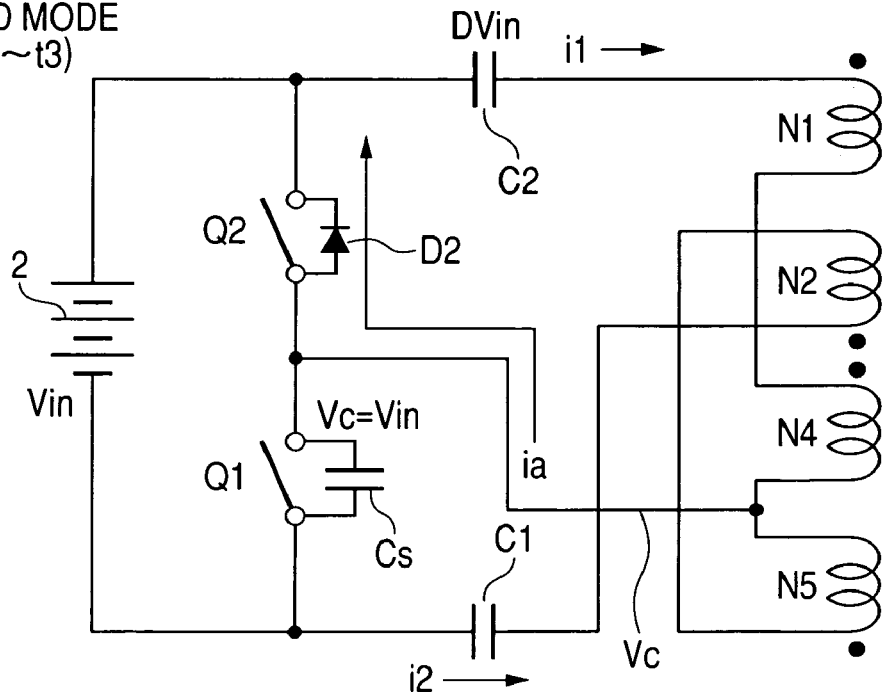
FIG. 14 is a circuit diagram schematically illustrating an equivalent circuit of the DC to DC converter illustrated in FIG. 10 and operating in the third mode.

Because the first switching element Q1 is in on state so that the current i1 supplied from the high-voltage battery 2 passes through the capacitor C2, the first primary winding N1, the third primary winding N4, and the first switching element Q1 toward the low-side terminal of the high-voltage battery 2 so as to charge the capacitor C2 (see FIG. 12).

This allows the current i1 to linearly increase with time (see FIG. 20).

On the other hand, electric energy stored in the capacitor C1 in the previous fourth mode by the high-voltage battery 2 causes the capacitor C1 to have a potential higher than the input voltage Vin of the high-voltage battery 2.

Thus, the current i2 discharged from the capacitor C1 also flows through the second primary winding N2, the fourth primary winding N5, and the first switching element Q1 to be returned to the capacitor C1 (see FIG. 12).

This allows the current i2 to linearly decrease with time (see FIG. 20).

Because the gradient of the increase of the current i1 is greater than that of the decrease of the current i2, the current ia equivalent to the sum of the currents i1 and i2 linearly increases with time.

Because the third switching element Q3 is in on state, the second transformer T2 operates as a transformer so as to generate a secondary voltage Vn6 in the second secondary winding N6 in the same manner as the DC to DC converter 1 (see FIG. 20). This allows a secondary current i40 to be output from the second secondary winding N6 (see FIG. 10).

On the other hand, because the currents i1 and i2 flow through the energized windings N1 and N2 while the fourth switching element Q4 is off state, the energized windings N1 and N2 serve as choke coils. Thus, in the first mode, magnetic energy generated in the first transformer T1 has been stored therein.

The choke functions (reactor operations) of the windings N1 and N2 allow the state of the magnetic flux therein changed by the transformer operation of the first transformer T1 during the previous fourth mode to be returned to its original state of magnetic flux (the beginning of the previous fourth mode). As described above, the current i2 allows the capacitor C2 to charge up, and the current i1 is discharged from the capacitor C1.

Operations of the Converter 1A in the Second Operating Mode

When each of the first and second switching elements Q1 and Q3 is turned off at a time t1 after a lapse of time from the time to with each of the second and fourth switching elements Q2 and Q4 being in off state, the magnetic energy stored in the primary windings of the first coil pair 25 creates an electromotive force therein, and similarly, the magnetic energy stored in the primary windings of the second coil pair 26 creates an electromotive force therein.

The electromotive forces created in the primary windings of the respective first and second coil pairs 25 and 26 allow the currents i1 and i2 to continuously flow.

As a result, the current ia equivalent to the sum of the currents i1 and i2 flows through a junction capacitance and/or parasitic capacitance of the first switching element (power MOS transistor) Q1 to be charged thereinto, increasing a voltage Vc across the first switching element Q1 (across the source and drain of the first switching element Q1) at the common terminal TeC (see FIG. 18).

Operations of the Converter 1A in the Third Operating Mode

When the voltage across the first switching element Q1 at the common terminal TeC exceeds the input voltage Vin due to the charged junction capacitance Cs and/or parasitic capacitance of the first switching element Q1 at a time t2 after a lapse of time from the time t1, the intrinsic diode D2 of the second switching element Q2 is turned on.

Thus, the current ia flows via the common terminal TeC toward the positive terminal of the high-voltage battery 2 to be charged into the battery 2, which makes it possible to regenerate power to be charged into the battery 2 based on the magnetic energy stored in each of the coil pairs 25 and 26. This allows the voltage across the first switching element Q1 to be clamped to the input voltage Vin.

Thereafter, the current ia decreases with decrease in the magnetic energy stored in each of the first and second coil pairs 25 and 26.

Note that the voltage Vc across the first switching element Q1 serves as a voltage to be applied thereto, and therefore, a voltage Vc' to be applied to the second switching element Q2 is given by "Vin−Vc".

Strictly speaking, when the voltage Vc across the first switching element Q1 exceeds the sum of the input voltage Vin and a forward voltage drop ΔV of the intrinsic diode D2 of the second switching element Q2, the intrinsic diode D2 is turned on.

Thereafter, the reduction in the magnetic energy stored in each of the coil pairs 25 and 26, the charging of the capacitor C2, and the discharging of the capacitor C1 are maintained. This causes the current ia to linearly decrease up to zero at a time t3 after a lapse of time from the time t2 (see FIG. 20).

Operations of the Converter 1A in the Fourth Operating Mode

When the current ia becomes zero at the time t=t3, the second switching element Q2 is turned on. The on timing of the second switching element Q2 can be determined to a point of time close to the time t3 defined by the time constant of the inverter circuit 11a.

Specifically, the second switching element Q2 can be turned on at a time before the time t3 in the third operating mode, or it can be turned on at a time immediately after the third operating mode is terminated at the time t3.

The former on timing is preferably determined to a point of time close to the time t3 as much as possible, which can reduce switching loss and noises of the second switching element Q2. Because the latter on timing of the second switching element Q2 appears after the current ia substantially becomes zero at the time t3, it is possible to prevent switching loss and noises of the second switching element Q2 from occurring.

Specifically, when each of the first and third switching elements Q2 and Q4 is turned on at a time t3 after the time t2 with the first and third switching elements Q1 and Q3 being in off state based on control of the controller 33 (see FIGS. 11, 15, and 20), the DC to DC converter 1A starts to operate in the fourth operating mode corresponding to the mode B.

Because the second switching element Q2 is in on state, electric energy stored in the capacitor C2 in the previous first mode by the high-voltage battery 2 causes the capacitor C2 to have a potential higher than the input voltage Vin of the high-voltage battery 2.

Figure 15:
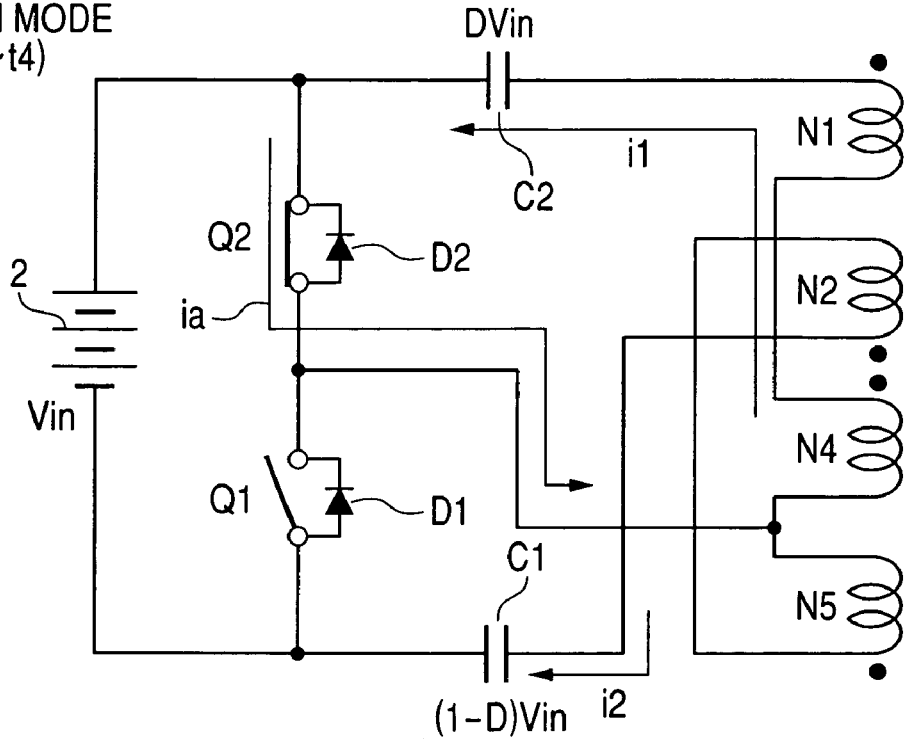
FIG. 15 is a circuit diagram schematically illustrating an equivalent circuit of the DC to DC converter illustrated in FIG. 10 and operating in the fourth mode.
Figure 16:
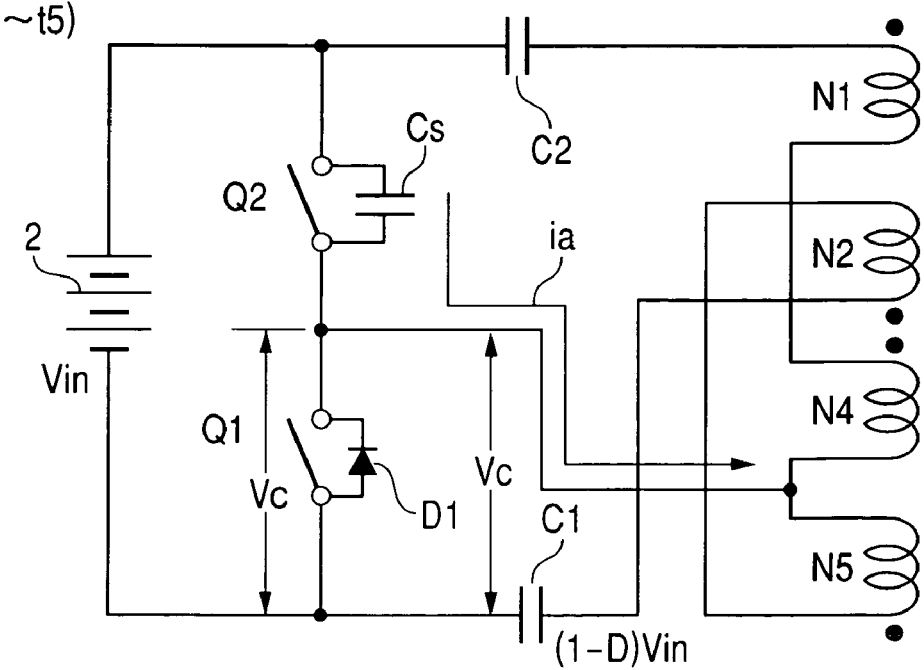
FIG. 16 is a circuit diagram schematically illustrating an equivalent circuit of the DC to DC converter illustrated in FIG. 10 and operating in the fifth mode.
Figure 17:
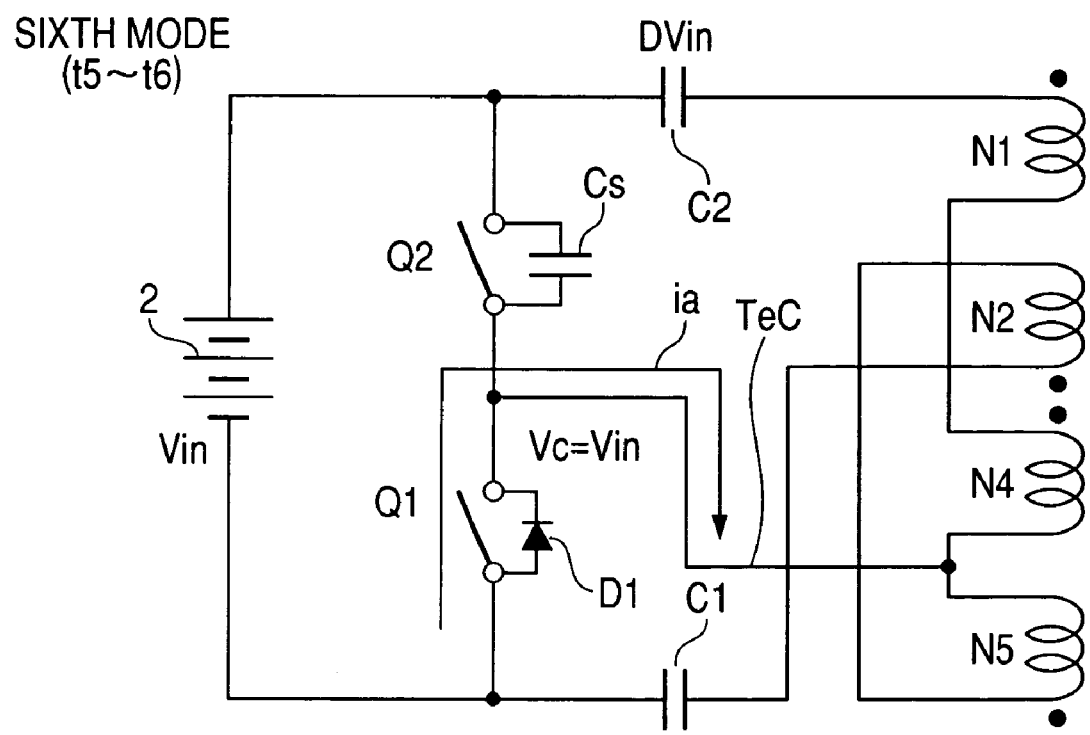
FIG. 17 is a circuit diagram schematically illustrating an equivalent circuit of the DC to DC converter illustrated in FIG. 10 and operating in the sixth mode.

Thus, the current i1 discharged from the capacitor C2 flows through the second switching element Q2, the third prima winding N4, and the first primary winding N1 to be returned to the capacitor C2 in the reverse direction from the direction in the third operating mode (see FIG. 15).

This allows the current i1 to linearly increases with time (see FIG. 20).

On the other hand, the current i2 supplied from the high-voltage battery 2 passes through the second switching element Q2, the fourth primary winding N5, the second primary winding N2, and the capacitor C1 toward the low-side terminal of the high-voltage battery 2 so as to charge the capacitor C1 in the reverse direction from the direction in the third operating mode (see FIG. 15).

Because the gradient of the increase of the current i1 is greater than that of the decrease of the current i2, the current ia, which is equivalent to the sum of the currents i1 and i2 and flows into the common terminal Tec in the reverse direction from the direction thereof in the third operating mode, linearly increases with time.

Because the currents i1 and i2 flow through the energized windings N4 and N5 while the fourth switching element Q4 is off state, the energized windings N4 and N5 serve as choke coils. Thus, in the fourth mode, magnetic energy generated in the second transformer T2 has been stored therein.

The choke functions (reactor operations) of the windings N4 and N5 allow the state of the magnetic flux therein changed by the transformer operation of the second transformer T2 during the previous first mode to be returned to its original state of magnetic flux (the beginning of the previous first mode).

Because the fourth switching element Q4 is in on state, the first transformer T1 operates as a transformer so as to generate a secondary voltage Vn3 in the first secondary winding N3 in the same manner as the DC to DC converter 1 (see FIG. 20). This allows a secondary current i30 to be output from the first secondary winding N3 (see FIG. 10). As described above, the current i2 allows the capacitor C1 to charge up, and the current i1 is discharged from the capacitor C2.

Operations of the Converter 1A in the Fifth Operating Mode

When each of the second and fourth switching elements Q2 and Q4 is turned off at a time t4 after a lapse of time from the time t3 with each of the first and third switching elements Q1 and Q3 being in off state, the magnetic energy stored in the primary windings of the first coil pair 25 creates an electromotive force therein, and similarly, the magnetic energy stored in the primary winding of the second coil pair 26 creates an electromotive force therein.

The electromotive forces created in the primary windings of the respective first and second coil pairs 25 and 26 allow the currents i1 and i2 to continuously flow.

As a result, the current ia equivalent to the sum of the currents i1 and i2 flows through a junction capacitance Cs and/or parasitic capacitance of the second switching element (power MOS transistor) Q2 to be charged thereinto. This causes a voltage Vc' across the second switching element Q2 at the common terminal TeC to increase (see FIG. 18).

Operations of the Converter 1A in the Sixth Operating Mode

When the voltage Vc across the first switching element Q1 further reduces so that, at a time t5 after a lapse of time from the time t4, the intrinsic diode D1 of the first switching element Q1 is turned on.

Thus, the current ia flows from the negative terminal of the high-voltage battery 2 into the common terminal TeC via the intrinsic diode D1. This allows the voltage across the first switching element Q1 to be clamped to a substantially 0 volts at the negative terminal of the high-voltage battery 2.

Strictly speaking, when the voltage Vc across the first switching element Q1 decreases to be lower than a threshold voltage, the intrinsic diode D1 is turned on; this threshold voltage is determined by subtracting a forward voltage drop ΔV of the first switching element Q1 from 0 volts. The operations of the DC to DC converter 1A in the sixth operating mode are carried out until the switching cycle T has elapsed since the time t0.

When the switching cycle T has elapsed since the time t0 at a time t6, the DC to DC converter 1A sequentially operates in the first to sixth modes as described above in the next switching cycle T.

Note that, in FIGS. 18 to 20, reference character Vq2g represents a gate voltage of the second switching element Q2, and reference character Vq1g represents a gate voltage of the first switching element Q1. Reference character Vq2 represents a voltage across the source and drain of the second switching element Q2, which is equivalent to the voltage Vc', and reference character Vq1 represents a voltage across the source and drain of the first switching element Q1, which is equivalent to the voltage Vc. The voltage Vc' can be given by "1-Vc".

Reference character Vq4 represents a voltage across the source and drain of the fourth switching element Q4, and reference character Vq3 represents a voltage across the source and drain of the third switching element Q3. Reference character Vc2 represents a voltage across the capacitor C2, and reference character Vc2 represents a voltage across the capacitor C1.

Reference character iq2 represents a current flowing through the second switching element Q2, and reference character iq1 represents a current flowing through the first switching element Q1. Reference character V5 represents a voltage across the first coil pair 25, and reference character V6 represents a voltage across the second coil pair 26.

Reference character i1 represents a current flowing through the capacitor C2, and reference character i2 represents a current flowing through the capacitor C2.

Reference character Vn3 represents a voltage across the first secondary winding N3, and reference character Vn6 represents a voltage across the second secondary winding N6. Reference character i30 represents a current flowing through the fourth switching element Q4 and the second transformer T2, and reference character i40 represents a current flowing through the third switching element Q3 and the first transformer T1.

Figure 21:
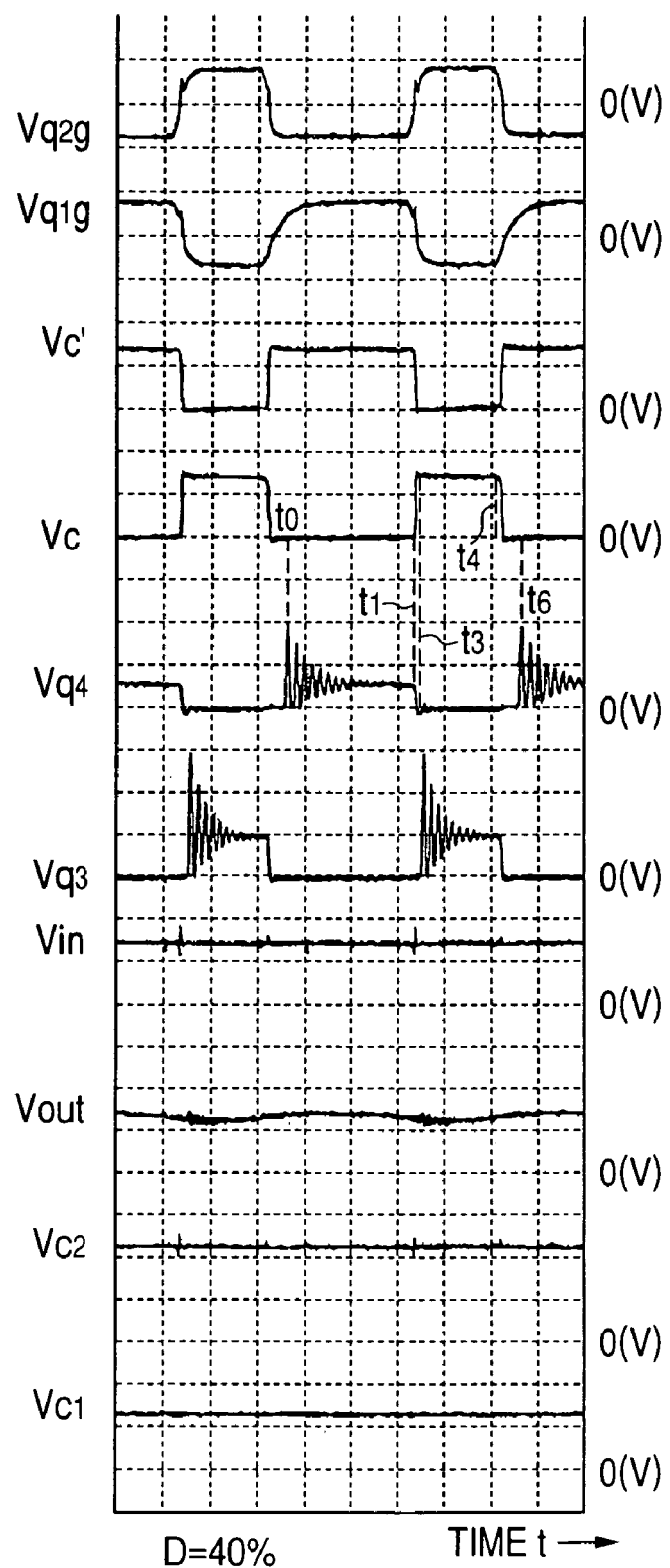
FIG. 21 is a waveform diagram schematically illustrating waveforms of voltages at predetermined portions of the DC to DC converter illustrated in FIG. 10; these waveforms of voltages have been previously measured during the DC to DC converter illustrated in FIG. 10 being tested when the on duty of the first switching element is set to 40%.
Figure 22:
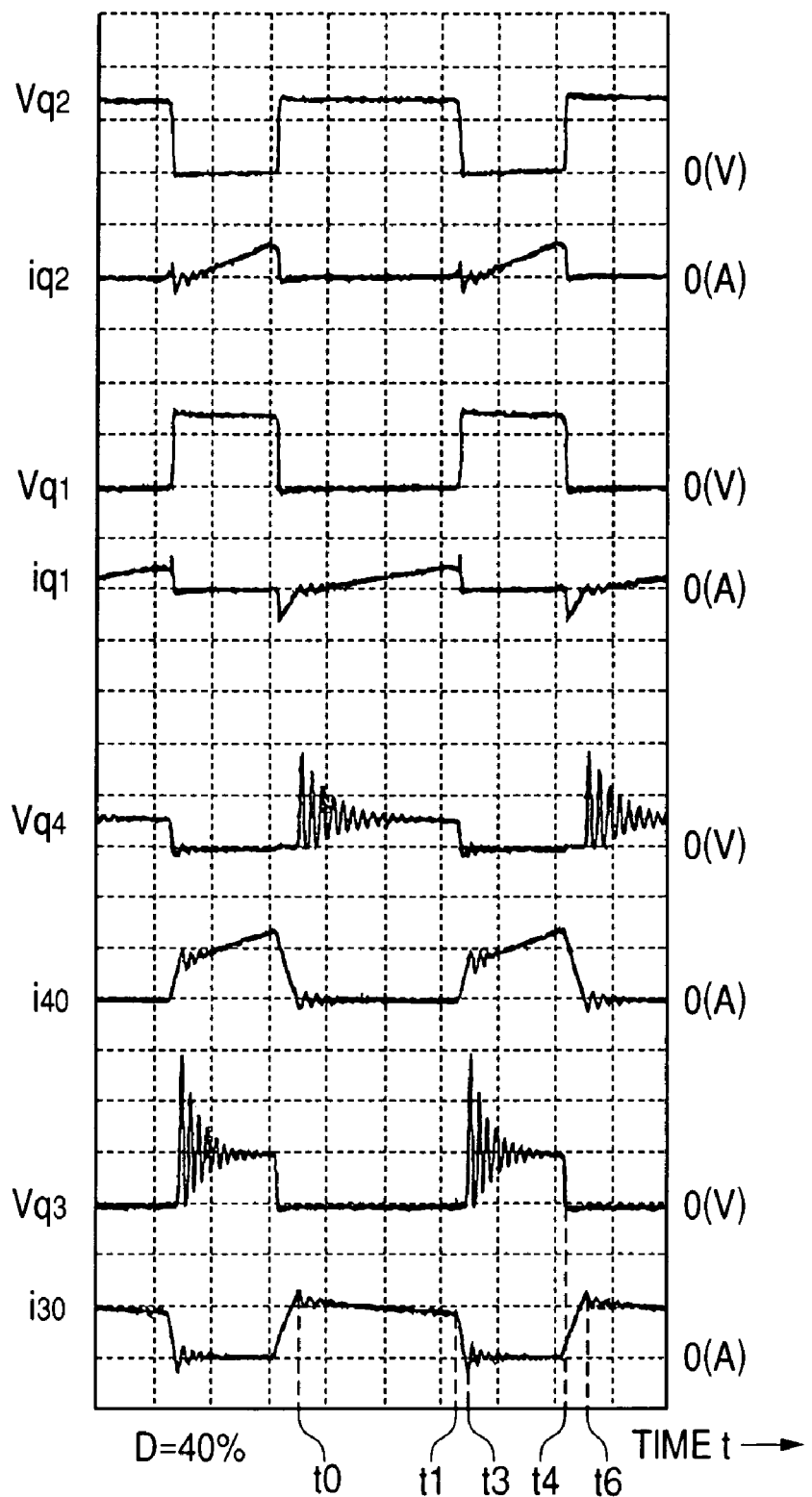
FIG. 22 is a waveform diagram schematically illustrating waveforms of voltages and currents at predetermined portions of the DC to DC converter illustrated in FIG. 10; these waveforms of voltages and currents have been previously measured during the DC to DC converter illustrated in FIG. 10 being tested when the on duty of the first switching element is set to 40%.
Figure 23:
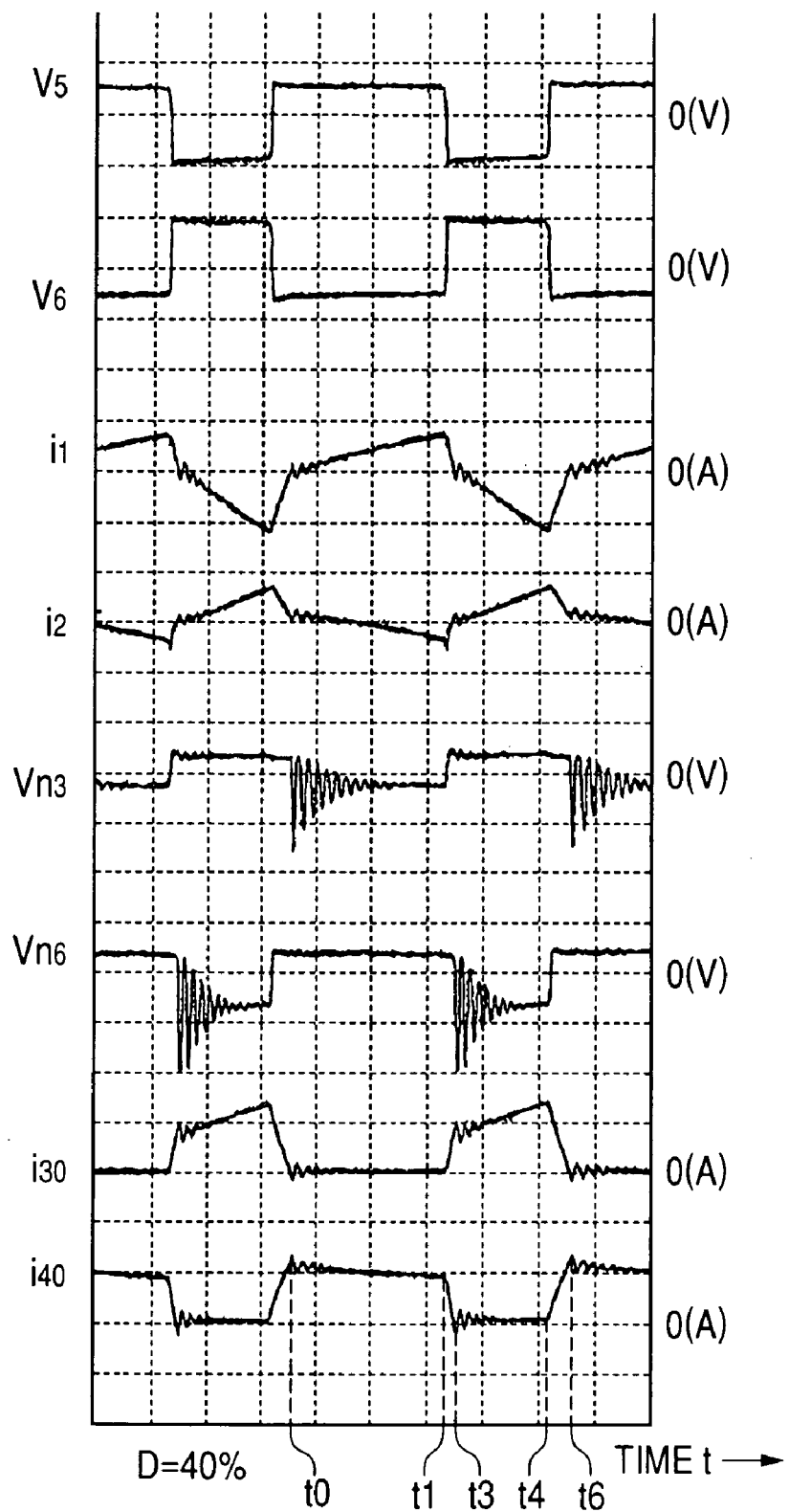
FIG. 23 is a waveform diagram schematically illustrating waveforms of voltages and currents at predetermined portions of the DC to DC converter illustrated in FIG. 10; these waveforms of voltages and currents have been previously measured during the DC to DC converter illustrated in FIG. 10 being tested when the on duty of the first switching element is set to 40%.
Figure 24:
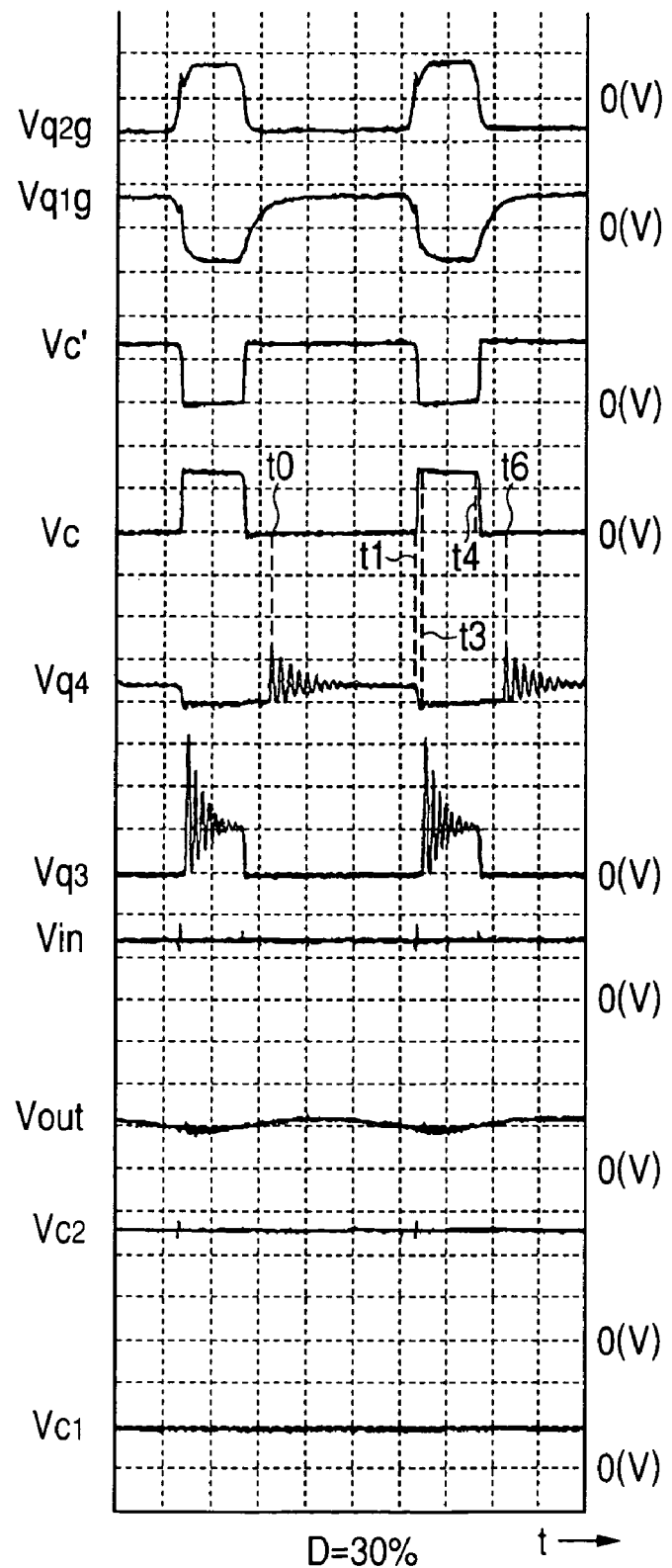
FIG. 24 is a waveform diagram schematically illustrating waveforms of voltages at predetermined portions of the DC to DC converter illustrated in FIG. 10; these waveforms of voltages have been previously measured during the DC to DC converter illustrated in FIG. 10 being tested when the on duty of the first switching element is set to 30%.
Figure 25:
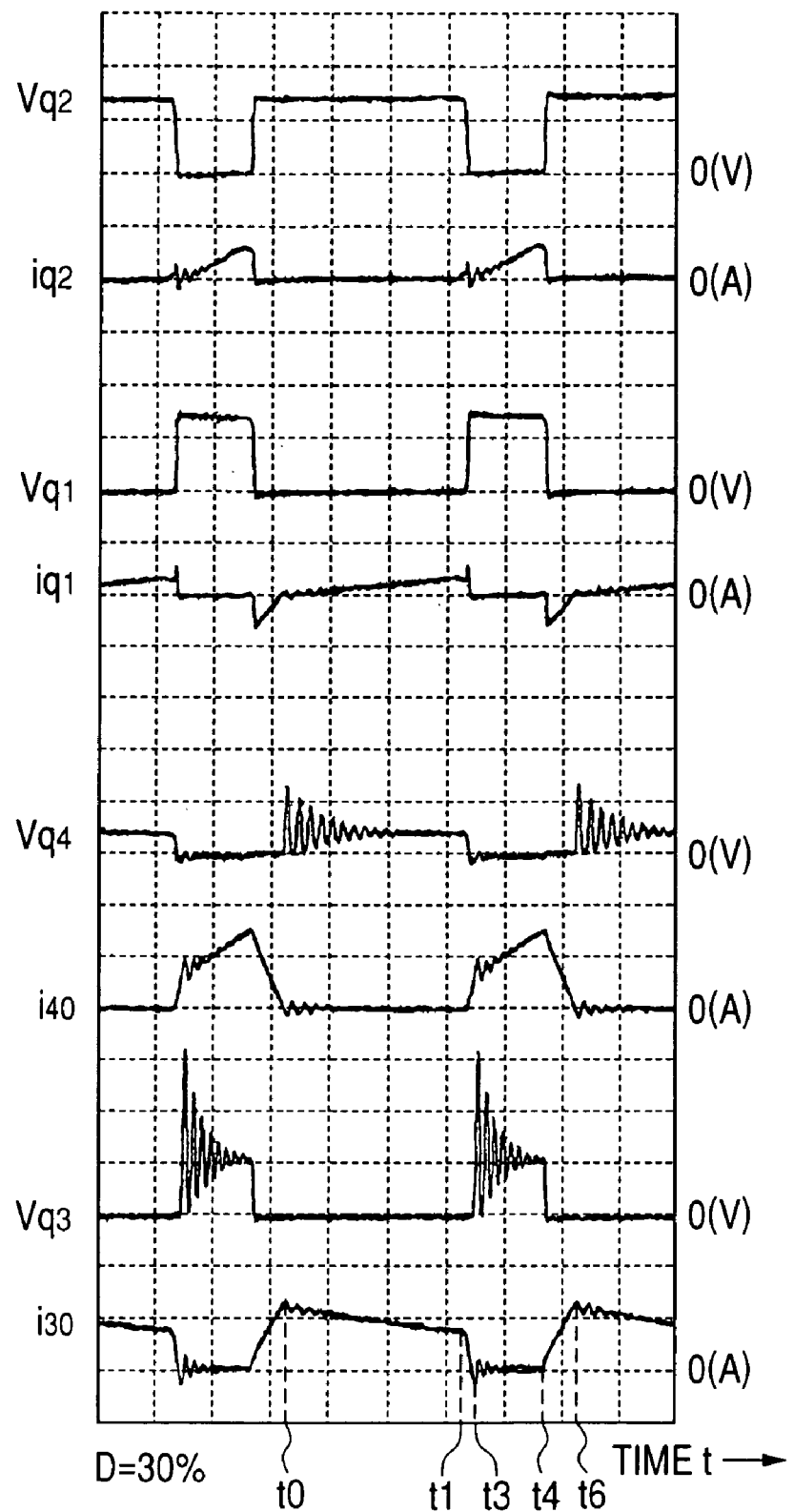
FIG. 25 is a waveform diagram schematically illustrating waveforms of voltages and currents at predetermined portions of the DC to DC converter illustrated in FIG. 10; these waveforms of voltages and currents have been previously measured during the DC to DC converter illustrated in FIG. 10 being tested when the on duty of the first switching element is set to 30%.
Figure 26:
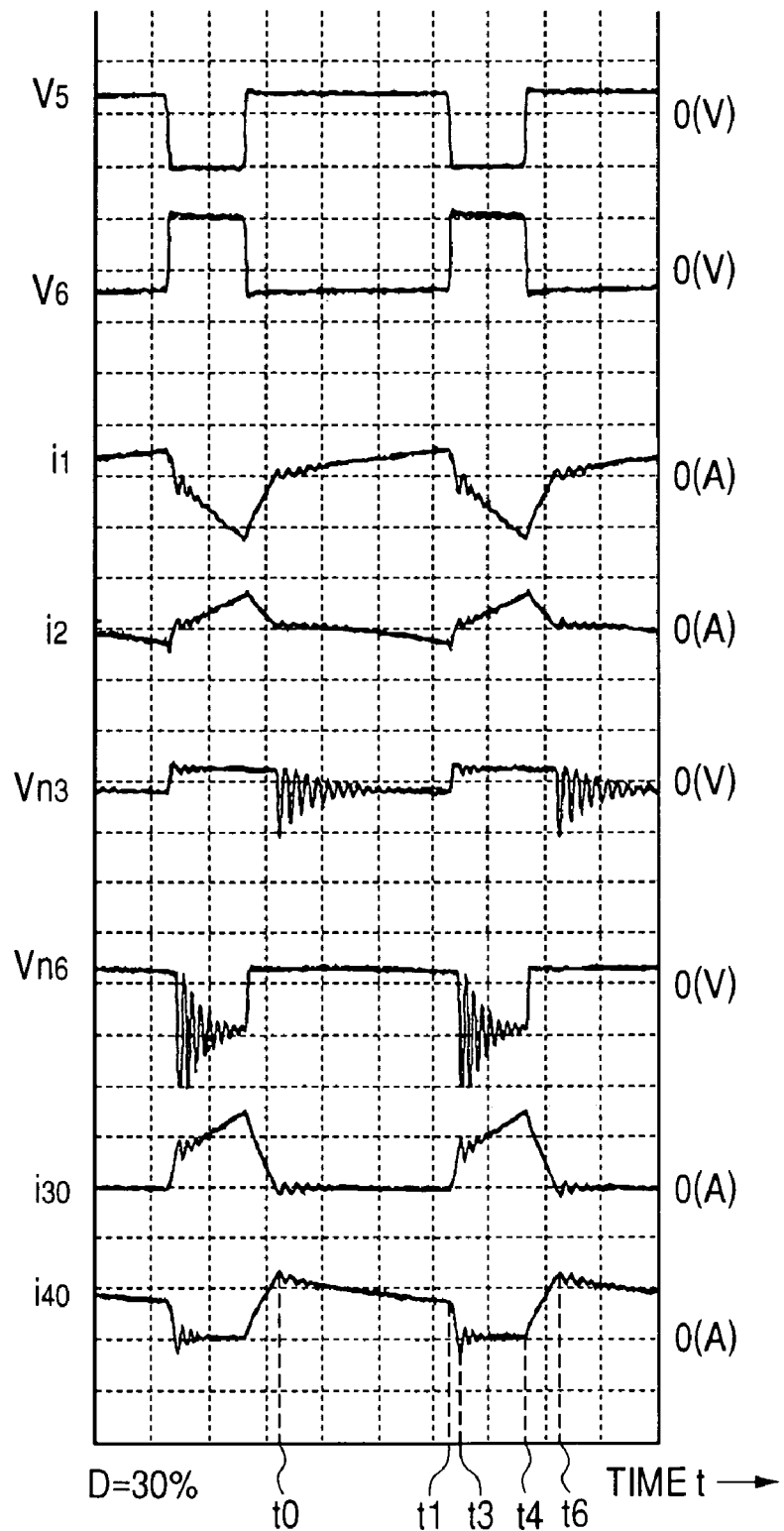
FIG. 26 is a waveform diagram schematically illustrating waveforms of voltages and currents at predetermined portions of the DC to DC converter illustrated in FIG. 10; these waveforms of voltages and currents have been previously measured during the DC to DC converter illustrated in FIG. 10 being tested when the on duty of the first switching element is set to 30%.

In addition, FIGS. 21 to 23 illustrate timing charts respectively corresponding to the timing charts in FIGS. 18 to 20 when the on duty D of the first switching element Q1 (third switching element Q3) is changed to be set to 40 percent. Moreover, FIGS. 24 to 26 illustrate timing charts respectively corresponding to the timing charts in FIGS. 18 to 20 when the on duty D of the first switching element Q1 (third switching element Q3) is changed to be set to 30 percent.

Figure 27:
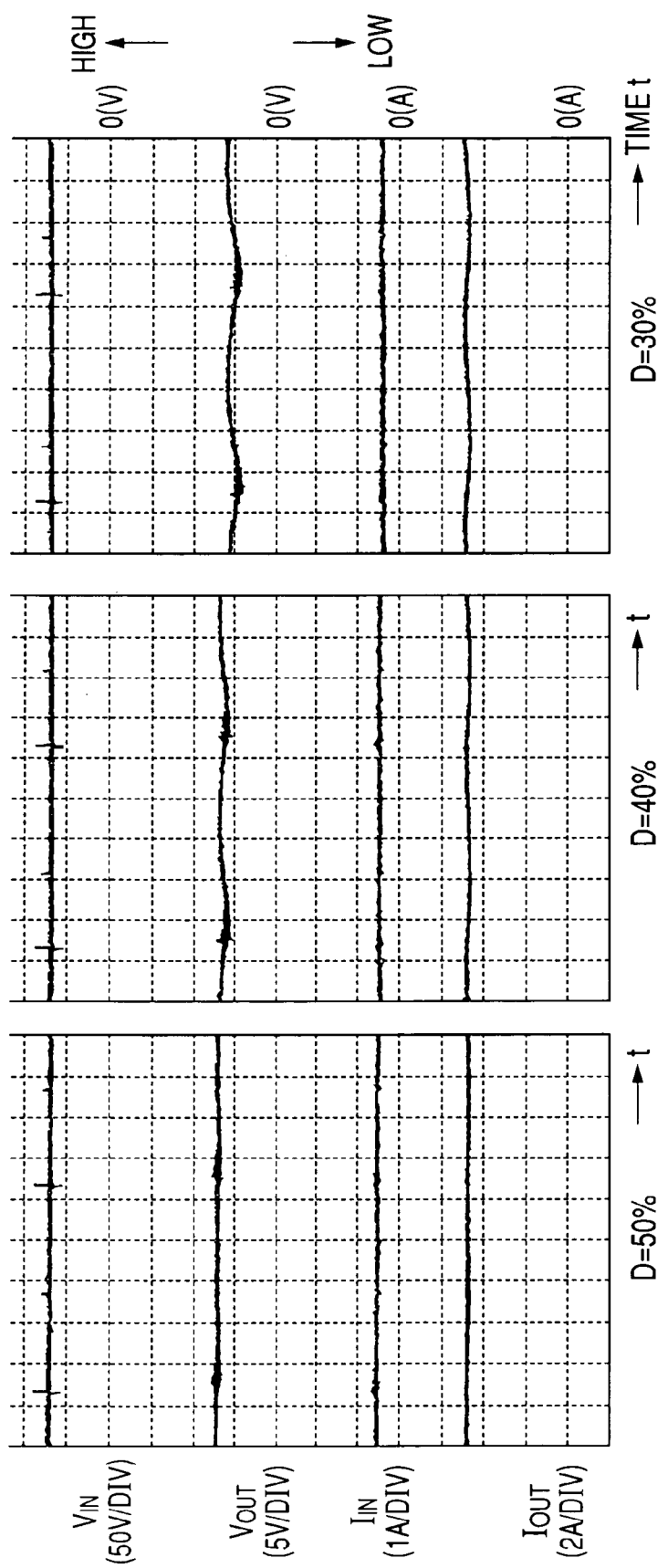
FIG. 27 is a waveform diagram schematically illustrating waveforms of input and output voltages and input and output currents of the DC to DC converter illustrated in FIG. 10, which have been previously measured during the DC to DC converter illustrated in FIG. 10 being tested while the on duty of the first switching element is changed to 50%, to 40%, and further to 30%.

FIG. 27 schematically illustrates waveforms of the input voltage Vin, the output voltage Vout, the input current Vin, and the output current Iout, respectively.

As illustrated in FIG. 27, when the on duty (duty cycle) D is reduced from that of 50 percent, ripple components increase in the output voltage Vout with increase in ripple components contained in the output current iout.

In addition, the output voltage Vout decreases with decrease in the on duty D from that of 50 percent, which is schematically illustrated in FIG. 27.

Figure 28:
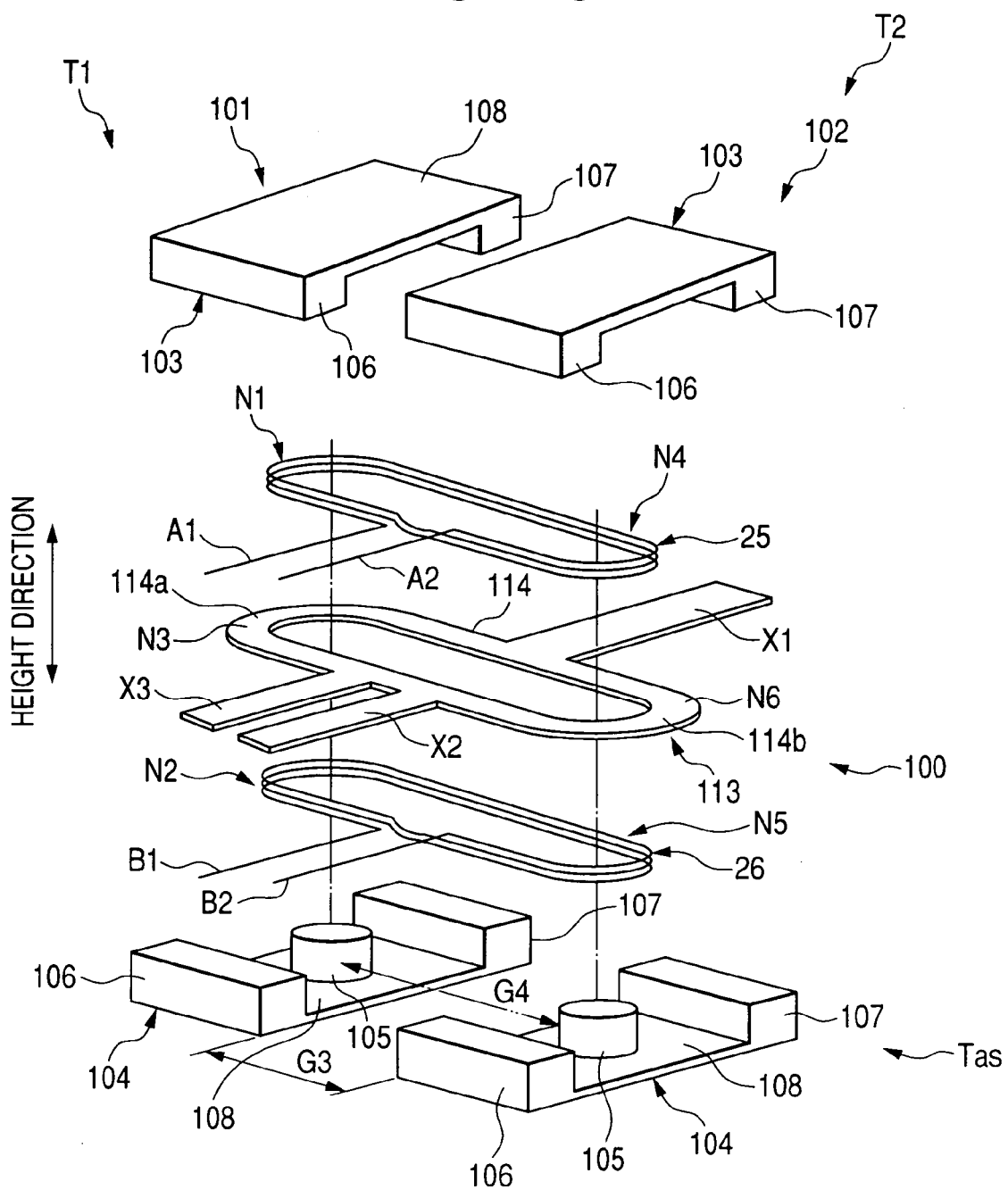
FIG. 28 is an exploded perspective view schematically illustrating an example of the structure of an integrated transformer assembly according to the embodiment of the present invention.
Figure 29:
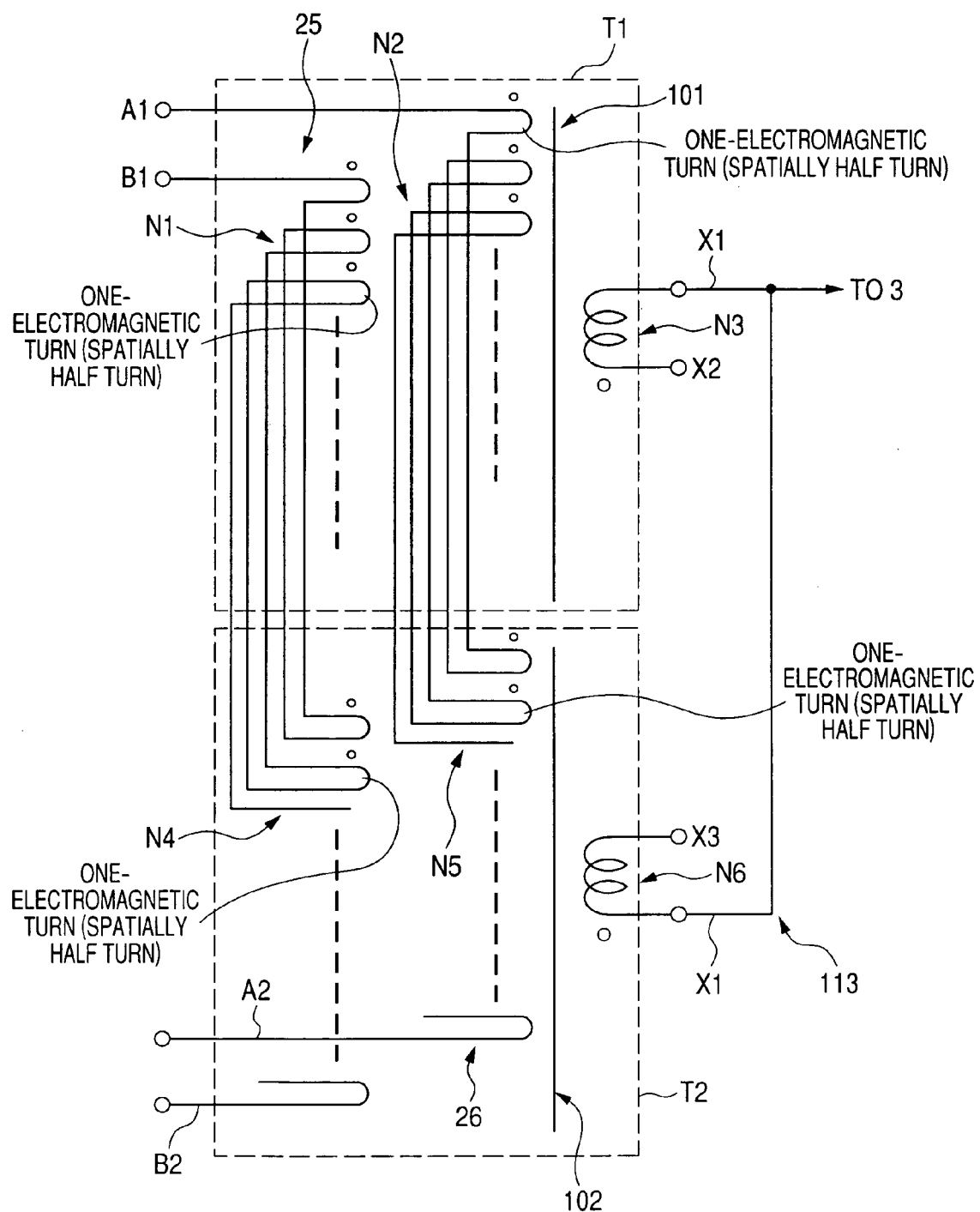
FIG. 29 is a circuit diagram schematically illustrating an equivalent circuit for the integrated transformer assembly illustrated in FIG. 28.

In the embodiment, the first and second transformers T1 and T2 are integrated with each other. FIG. 28 schematically illustrates an example of the structure of an integrated transformer assembly Tas consisting of the first and second transformers T1 and P2 according to the embodiment. FIG. 29 schematically illustrates an equivalent circuit for the integrated transformer assembly Tas.

The integrated transformer assembly Tas is composed of a first core member 101 around which the first and second primary windings N1 and N2 and the first secondary winding N3 are wound, and a second core member 102 around which the third and fourth primary windings N4 and N5 and the second secondary winding N6 are wound; these first and second core members 101 and 102 are separated from each other.

Specifically, each of the first and second core members 101 and 102 consists of a first E-shaped core 103 and a second E-shaped core 104 with the same shape as the first E-shaped core 103.

For example, as each of the first and second E-shaped cores 103 and 104, a ferrite-powder molded E-shaped core is preferably used. The ferrite-powder molded E-shaped core allows a high-frequency switching current to flow therethrough.

Each of the first and second E-shaped cores 103 and 104 of each of the first and second core members 101 and 102 is provided with a rectangular plate-like base 108, and a substantially cylindrical center pole 105 arranged on or opposing an one surface at a center portion of the base 108 to be magnetically coupled to the base 108. For example, the center pole 105 is mounted on the one surface of the center portion of the base 108 so as to extend therefrom in a direction orthogonal to the one surface thereof.

Each of the first and second E-shaped cores 103 and 104 of each of the first and second core members 101 and 102 is provided with a pair of rectangular-cylindrical side poles 106 and 107. Each of the side poles 106 and 107 is arranged on or opposing the one surface at a corresponding one lateral end of the base 108 in parallel to the center pole 105 to be magnetically coupled to the base 108. For example, each of the side poles 106 and 107 is mounted on the one surface of the corresponding one lateral end of the base 108 so as to extend therefrom in a direction orthogonal to the one surface thereof.

Specifically, the side pole 106, the center pole 105, and the side pole 107 of one of the first and second E-shaped cores 103 and 104 of each of the first and second core members 101 and 102 is aligned in a longitudinal direction of the one of the first and second E-shaped cores 103 and 104.

For example, the center pole 105 and each of the side poles 106 and 107 of each of the first and second E-shaped cores 103 and 104 of the first core member 101 have a substantially same height with respect to the base 108.

Similarly, the center pole 105 and each of the side poles 106 and 107 of each of the first and second S-shaped cores 103 and 104 of the second core member 102 have a substantially same height with respect to the base 108.

The height of each of the center pole 105, the side pole 106, and the side pole 107 of each of the first and second E-shaped cores 103 and 104 of the first core member 101 is substantially identical to that of each of the center pole 105, the side pole 106, and the side pole 107 of each of the first and second E-shaped cores 103 and 104 of the second core member 102.

The center pole 105 and each of the side poles 106 and 107 of each of the first and second E-shaped cores 103 and 104 of each of the first and second core members 101 and 102 can have different heights with respect to the base 108, respectively.

Figure 30A:
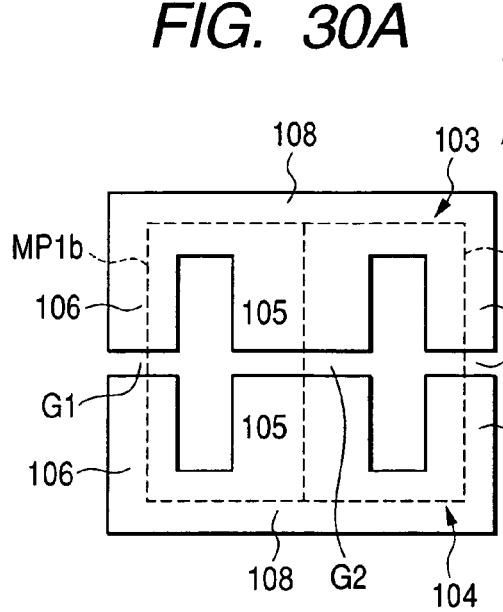
FIG. 30A is a view schematically illustrating a longitudinal side of each of first and second E-shaped cores of a first core member of the integrated transformer assembly illustrated in FIG. 28.
Figure 30B:
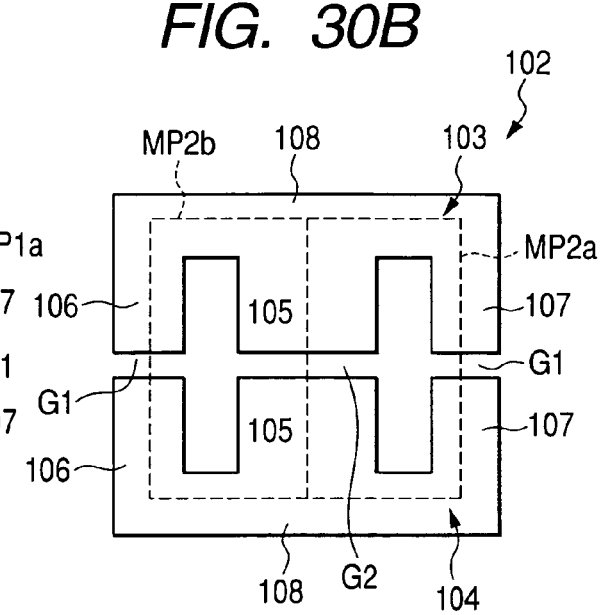
FIG. 30B is a view schematically illustrating a longitudinal side of each of first and second E-shaped cores of a second core member of the integrated transformer assembly illustrated in FIG. 28.

As illustrated in FIGS. 30A and 30B, in each of the first and second core members 101 and 102, the first E-shaped core 103 and the second E-shaped core 104 are arranged such that:

each of the side poles 106 and 107 of the first E-shaped core 103 is symmetrically opposite to a corresponding one of the side poles 106 and 107 of the second B-shaped core 104 with a gap G1 therebetween; and the center pole 106 of the first E-shaped core 103 is symmetrically opposite to that of the second E-shaped core 104 with a gap G2 therebetween.

This arrangement of the first and second E-shaped cores 103 and 104 provides each of the first and second core members 101 and 102.

The bases 108 of the first E-shaped cores 103 of the first and second core members 101 and 102 are symmetrically arranged opposing each other with a gap G3 therebetween in a direction orthogonal to the longitudinal direction of each of the first E-shaped cores 103 (see FIG. 28). Similarly, the bases 108 of the second E-shaped cores 104 of the first and second core members 101 and 102 are symmetrically arranged opposing each other with the gap G3 therebetween in a direction orthogonal to the longitudinal direction of each of the first E-shaped cores 103 (see FIG. 28).

In other words, the center poles 105 of the first E-shaped cores 103 of the first and second core members 101 and 102 are symmetrically arranged opposing each other with a gap G4 therebetween (see FIG. 28). Similarly, the center poles 105 of the second E-shaped cores 104 of the first and second core members 101 and 102 are symmetrically arranged opposing each other with the gap G4 therebetween (see FIG. 28).

The structure of the first core member 101 provides a closed magnetic circuit with the gaps G1 and G2 consisting of a first pair of magnetic pats MP1a and MP1b (see FIG. 30A).

Specifically, one magnetic path MP1a of the first pair of magnetic paths is composed of the center pole 105 of the first E-shaped core 103, the gap G2, the center pole 105 of the second E-shaped core 104, the side pole 107 of the second E-shaped core 104, the gap G1, and the side pole 107 of the first E-shaped core 103.

The other magnetic path MP1b of the pair of magnetic paths is composed of the center pole 105 of the first E-shaped core 103, the gap G2, the center pole 105 of the second E-shaped core 104, the side pole 106 of the second E-shaped core 104, the gap G1, and the side pole 107 of the first E-shaped core 103.

Similarly, the structure of the second core member 102 provides a closed magnetic circuit with the gaps G1 and G2 consisting of a second pair of magnetic paths MP2a and MP2b substantially independent from the first pair of magnetic paths MP1a and MP1b (see FIG. 303).

Specifically, one magnetic path MP2a of the second pair of magnetic paths is composed of the center pole 105 of the first E-shaped core 103, the gap G2, the center pole 105 of the second E-shaped core 104, the side pole 107 of the second E-shaped core 104, the gap G1, and the side pole 107 of the first E-shaped core 103.

The other magnetic path MP2b of the pair of magnetic paths is composed of the center pole 105 of the first E-shaped core 103; the gap G2, the center pole 105 of the second E-shaped core 104, the side pole 106 of the second E-shaped core 104, the gap G1, and the side pole 107 of the first E-shaped core 103.

The first coil pair 25 is wound around the center poles 105 of the first and second core members 101 and 102, which are adjacent to each other via the gap G4.

Specifically, as schematically illustrated in FIG. 29, because the first coil pair 25 consists of the series-connected first and third primary windings N1 and N4, the first coil pair 25 can be regarded as one wire so strap having one end serving as the lead A1 and the other end serving as the lead A2. Similarly, because the second coil pair 26 consists of the series-connected second and fourth primary windings N2 and N5, the second coil pair 26 can be regarded as one wire strap having one end serving as the lead B1 and the other end serving as the lead B2.

The one wire strap 25 (the first coil pair 25) is alternately wound, for each one electromagnetic turn, around the center pole 105 of the first E-shaped core 103 of the first coil member 101 in a substantially U-shaped loop and around the center pole 105 of the first E-shaped core 103 of the second coil member 102 in a substantially U-shaped loop.

In the embodiment, the center pole 105 of the first E-shaped core 103 of the first coil member 101 is adjacently arranged to that of the first E-shaped core 103 of the second coil member 102 via the gap G4 therebetween. For this reason, the alternative winding of the one wire strap 25 around the center pole 105 of the first coil member 101 and that of the second coil member 102 can be easily executed.

The U-shaped portion around the center pole 105 of the first coil member 101 for each one electromagnetic turn and that around the center pole 105 of the second coil member 102 therefor constitute a substantially ellipsoidal shape.

One electromagnetic turn of the one wire strap 25 alternately wound around the center pole 105 of the first coil member 101 and that of the second coil member 102 is spatially configured to be a half turn (see FIGS. 28 and 29).

The U-shaped portions of the one wire strap 25 wound around the center pole 105 of the first coil member 101 constitute the first primary winding N1, and similarly, the U-shaped portions of the one wire strap 25 wound around the center pole 105 of the second coil member 102 constitute the third primary winding N4.

As well as the first coil pair 25, the one wire strap 26 (the second coil pair 26) is alternately wound, for each one electromagnetic turn, around the center pole 105 of the second E-shaped core 104 of the first coil member 101 in a substantially U-shaped loop and around the center pole 105 of the second E-shaped core 104 of the second coil member 102 in a substantially U-shaped loop.

In the embodiment, the center pole 105 of the second E-shaped core 104 of the first coil member 101 is adjacently arranged to that of the second E-shaped core 104 of the second coil member 102 via the gap G4 therebetween. For this reason, the alternative winding of the one wire strap 26 around the center pole 105 of the first coil member 101 and that of the second coil member 102 can be easily executed.

The U-shaped portion around the center pole 105 of the first coil member 101 for each one electromagnetic turn and that around the center pole 105 of the second coil member 102 therefor constitute a substantially ellipsoidal shape.

One electromagnetic turn of the one wire strap 26 wound around the center pole 105 of each of the first and second coil members 101 and 102 appears to be a spatially half turn (see FIGS. 28 and 29).

The U-shaped portions of the one wire strap 26 wound around the center pole 105 of the first coil member 101 constitute the second primary winding N2, and similarly, the U-shaped portions of the one wire strap 25 wound around the center pole 105 of the second coil member 102 constitute the fourth primary winding N5.

The integrated transformer assembly Tas is also composed of an integrated secondary coil member 113 constituting the first and second secondary windings N3 and N5. For example, the integrated secondary coil member 13 is made of a molded copper plate.

Specifically, the integrated secondary coil member 113 is provided with a substantially ellipsoidal portion 114 consisting of a first U-shaped portion 114a and a second U-shaped portion 114b whose both ends continuously extend from both ends of the first U-shaped portion 114a.

The first U-shaped portion 114a is arranged between the first primary winding N1 and the second primary winding N2 so as to be around the center pole 105 of the first coil member 101, which constitutes the first secondary winding N3 of one electromagnetic turn (spatially half turn).

Similarly, the second U-shaped portion 114b is arranged between the third primary winding N4 and the fourth primary winding N5 so as to be around the center pole 105 of the second coil member 102, which constitutes the second secondary winding N5 of one electromagnetic turn (spatially half turn).

The integrated secondary coil member 113 is also provided with first to third leads X1 to X3. The first lead X1 outwardly extends from a first longitudinal side of the ellipsoidal portion 114 at which one end of the first U-shaped portion 114a and a corresponding one end of the second U-shaped portion 114b are continuously linked to each other.

The second and third leads X2 and X3 outwardly extend from a second longitudinal side of the ellipsoidal portion 114 in parallel to each other; the second longitudinal side is opposite to the first longitudinal side thereof.

The first longitudinal side of the ellipsoidal portion 114 of which the first lead X1 is pulled out corresponds to, for example, one side of the integrated transformer assembly Tas composed of the side poles 107 of the first and second core members 101 and 102.

In contrast, the leads A1 and A2 are respectively pulled out of the first primary winding N1 and the second primary winding N2 from the other side of the integrated transformer assembly Tas composed of the side poles 106 of the first and second core members 101 and 102.

Similarly, the leads B1 and B2 are respectively pulled out of the first primary winding N1 and the second primary winding N2 from the other side of the integrated transformer assembly Tas composed of the side poles 106 of the first and second core members 101 and 102.

As illustrated in FIG. 29, the lead X1 of the integrated secondary coil member 113 is connected to the connecting line 31 (see FIGS. 2 and 10) connected to the one terminal 3a of the load 3. The second lead X2 is connected to the one terminal of the fourth switching element Q4, and the third lead X3 is connected to the one terminal of the third switching element Q3.

As described above, in each of the DC to DC converters 50, 1, and 1A according to the embodiment, the integrated transformer assembly Tas is composed of the first core member 101 and second core member 102, which are separated from each other. The first core member 101 provides the first pair of magnetic paths MP1a and MP1b, and the second core member 102 provides the second pair of magnetic paths MP2a and MP2b, which are substantially independent from the first pair of magnetic paths MP1a and MP1b.

In each of the DC to DC converters 50, 1 and 1A, the first coil pair 25 is provided in both of the first and second core members 101 and 102 so as to be magnetically linked to the first pair of magnetic paths MP1a and MP1b and the second pair of magnetic paths MP2a and MP2b.

Specifically, the first coil pair 25 composed of the paired first and third primary windings N1 and N3 is alternately wound, for each one electromagnetic turn, around the center pole 105 of the first coil member 101 and around the center pole 105 of the second coil member 102.

Similarly, the second coil pair 26 composed of the paired second and fourth primary windings N2 and N4 is alternately wound, for each one electromagnetic turns around the center pole 105 of the first coil member 101 and around the center pole 105 of the second coil member 102.

As set forth above, one electromagnetic turn of each of the first and second coil pairs 25 and 26 alternately wound around the center pole 105 of the first core member 101 and that of the second coil member 102 is spatially configured to be a half turn (see FIGS. 28 and 29).

In contrast when each of the first and second coil pairs 25 and 26 is sequentially wound around the center pole 105 of the first core member 101 and thereafter around the center pole 105 of the second coil member 102, one electromagnetic turn of each of the first and second coil pairs 25 and 26 is matched with one spatial turn.

For this reason, as compared with the structure in which each of the first and second coil pairs 25 and 26 is sequentially wound around the center pole 105 of the first core member 101 and thereafter around the center pole 105 of the second coil member 102, the structure of the integrated transformer assembly Tas makes it possible to reduce the length of each of the first and second coil pairs 25 and 26, thus reducing the integrated transformer assembly Tas in size and weight. The reduction of the length of each of the first and second coil pairs 25 and 26 also allows coil loss thereof to be reduced.

Accordingly, the structure of the integrated transformer assembly Tas reduces the need for DC to DC converters to use a pair of transformers having a specific common-magnetic path structure set forth above.

Specifically, in each of the DC to DC converters 50, 1, and 1A, the first coil pair 25, the first E-shaped core 103 and second E-shaped core 104, which are general-purpose cores, are used for each of the first and second transformers T1 and T2 of the integrated transformer assembly Tas. This makes it possible to reduce the cost of manufacturing the integrated core Tas, and furthermore, each of the DC to DC converters 50, 1, and 1A.

The structure of the integrated transformer assembly Tas allows the leads A1 and A2 for the first coil pair 25, the leads B1 and B2 for the second coil pair 26, and the leads X1 to X3 for the integrated secondary coil member 113 to be pulled out thereof via the gap G3 between the first and second transformers T1 and T2 (the first and second core members 101 and 102).

Specifically, in the embodiment, the first lead X1 of the first and second primary windings N3 and N6 is pulled out of the integrated transformer assembly Tas in a direction opposite to a direction in which the leads A1, A2, B1, and B2 are pulled out of the integrated transformer assembly Tas. This makes it possible to easily pull the leads A1, A2, B1, B2, and X1 out of the integrated transformer assembly Tas.

In addition, because the first lead X1 is connected to the capacitor C3 of the synchronous rectifier 21, and the leads A1, A2, B1, and B2 are connected to the terminals Te2, Tec, Te1, and Tec connected to the inverter circuit 11 or battery 2, it is possible to avoid interference between the components of the inverter circuit 11 and those of the synchronous rectifier 21.

In addition, in the embodiment, the leads A1 and A2 for the first coil pair 25, the leads B1 and B2 for the second coil pair 26, and the leads X1 to X3 for the integrated secondary coil member 113 can be pulled out thereof via a space between one pair of side poles 106 of the first core member 101 and one pair of side poles 107 thereof and that between one pair of side poles 106 of the second core member 102 and one pair of side poles thereof.

Thus, the structure of the integrated transformer assembly Tas increases degree of freedom of pullout of leads thereof.

In the embodiment, the first coil pair 25 is alternately wound, for each one electromagnetic turn, around the center pole 105 of the first E-shaped core 103 of the first coil member 101 in a substantially U-shape and around the center pole 105 of the first E-shaped core 103 of the second coil member 102 in a substantially U-shape.

In a specific manner of installing the first coil pair 25 in the first and second coil members 101 and 102, one wire strap previously formed with a pair of the U-shaped loops therein is prepared as the first coil pair 25. One U-shaped loops of the pair of the U-shaped loops is collectively encircled in the center pole 105 of the first E-shaped core 103 of the first core member 101, and the other U-shaped loops of the pair of the U-shaped loops is collectively encircled in the center pole 105 of the first E-shaped core 103 of the second core member 102.

This allows the first coil pair 25 to be easily installed in the first and second core member 101 and 102.

The second coil pair 26 can be easily installed in the first and second core members 101 and 102 in the same manner as the first coil pair 25.

In the integrated transformer assembly Tas, the length of each of the gaps G1 and G2 can be individually adjusted so as to avoid magnetic saturation in the closed magnetic circuit formed in each of the first and second core members 101 and 102. Specifically, the length of each of the gaps G1 and G2 of the first core member 101 can be adjusted to be equal to or different from that of a corresponding one of the gaps G1 and G2 of the second core member 102 so as to avoid magnetic saturation in the closed magnetic circuit formed in each of the first and second core members 101 and 102.

The cross sectional area of each of the first and second magnetic paths MP1a and MP1b of the first core member 101 can be adjusted to be equal to or different from a corresponding one of the first and second magnetic paths MP2a and MP2b of the second core member 102.

Figure 31:
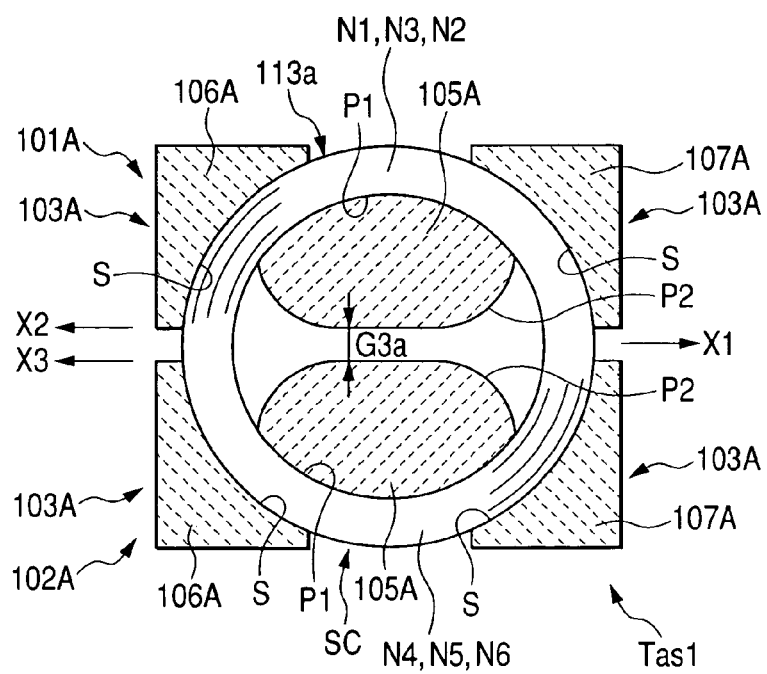
FIG. 31 is a cross sectional view schematically illustrating the structure of an integrated transformer assembly according to a first modification of the embodiment of the present invention.

The structure of an integrated transformer assembly Tas1 according to a first modification of the embodiment of the present invention is illustrated in FIG. 31.

Each of first and second core members 101A and 102A of the integrated transformer assembly Tas1 consists of a first core 103A and a second core 104A. The second core 104A is not illustrated in FIG. 31, but it has a substantially identical structure with that of the first core 103A.

The first core 103A of each of the first and second core members 101A and 102A is provided with a center pole 105A with a predetermined height and a substantially semicircular shape in its lateral cross section orthogonal to the predetermined height. Similarly, the second core 104A of each of the first and second core members 101A and 102A is provided with a center pole 105A with a predetermined height and a substantially semicircular shape in its lateral cross section orthogonal to the predetermined height.

The center pole 105A of the first core 103A of each of the first and second core members 101A and 102A has an outer periphery. A first portion P1 of the outer periphery of the center pole 105A extends in a circle in a lateral direction orthogonal to the predetermined height.

A second portion P2 of the outer periphery of the center pole 105A, which is opposite to the first portion P1 thereof, linearly extends and has both rounded ends.

The center poles 105A of the first core 103A of each of the first and second core members 101A and 102A are arranged such that:

the second portion P2 of the outer periphery of one of the center poles 105A faces that of the outer periphery of the other thereof with a gap G3a therebetween; and a trajectory along each of the first portions P1 of the outer peripheries of the respective center poles 105A in the lateral direction has a substantially circular shape.

The center poles 105A of the second core 104A of each of the first and second core members 101A and 102A are arranged in the same manner as the center poles 105A of the first core 103A.

The first core 103A of each of the first and second core members 101A and 102A is also provided with a pair of triangular side poles 106A and 107A each with a predetermined height. Similarly, the second core 104A of each of the first and second core members 101A and 102A is also provided with a pair of triangular side poles 106A and 107A each with a predetermined height.

Each of the triangular side poles 106A and 107A of the first core 103A of each of the first and second cores 103A and 104A has one longitudinal side S in its lateral cross section orthogonal to the predetermined height. The longitudinal side S of each of the triangular side poles 106A and 107A of the first core 103A is inwardly curved in a circle in a lateral direction orthogonal to the predetermined height.

The triangular side poles 106A and 107A of the first core 103A of the first core member 101A are arranged such that the longitudinal sides S of them are opposite to each other via the first portion P1 of the outer periphery of the center pole 105A of the first core 103A of the first core member 101A so as to provide a first semicircular annular space therebetween.

Similarly, the triangular side poles 106A and 107A of the first core 103A of the second core member 102A are arranged such that the longitudinal sides S of them are opposite to each other via the first portion P1 of the outer periphery of the center pole 105A of the first core 103A of the second core member 102A so as to provide a second semicircular annular space therebetween.

These arrangements of the center poles 105A and the side poles 106A and 107A of the first cores 103A of the respective first and second core members 101A and 102A provide a substantially circular space SC between the first portions P1 of the outer peripheries of the respective center poles 105a and the longitudinal sides S of the respective side poles 106A and 107A.

The center poles 105A and the side poles 106A and 107A of the second cores 104A of the respective first and second core members 101A and 102A are arranged in the same manner as those of the first cores 103A thereof.

Like the integrated transformer assembly Tas, the structure of the first core member 101A provides a closed magnetic circuit consisting of a first pair of magnetic paths. One magnetic path of the first pair of magnetic paths is composed of, in the first core member 101A, the center pole 105A of the first core 103A, the center pole 105A of the second core 104A, the side pole 107A of the second core 104A, and the side pole 107A of the first core 103A.

The other magnetic path of the first pair of magnetic paths is composed of, in the first core member 101A, the center pole 105A of the first core 103A, the center pole 115A of the second core 104A, the side pole 106A of the second core 104A, and the side pole 106A of the first core 103A.

Similarly, the structure of the second core member 102A provides a closed magnetic circuit consisting of a second pair of magnetic paths. One magnetic path of the second pair of magnetic paths is composed of, in the second core member 102A, the center pole 105A of the first core 103A, the center pole 105A of the second core 104A, the side pole 107A of the second core 104A, and the side pole 107A of the first core 103A.

The other magnetic path of the second pair of magnetic paths is composed of, in the second core member 102A, the center pole 105A of the first core 103A, the center pole 105A of the second core 104A, the side pole 106A of the second core 104A, and the side pole 106A of the first core 103A.

A combination of a cross sectional area of each of the first pair of magnetic paths of the first core member 101A and that of each of the second pair of magnetic paths of the second core member 102A has a substantially square shape illustrated by hatching in FIG. 31.

As well as the embodiment of the present invention set forth above, the first coil pair 25 is alternately wound, for each one electromagnetic turn, around the center pole 105A of the first coil member 101A and that of the second coil member 102A so as to be disposed in the circular space SC. This allows the first coil pair 25 composed of the first and third primary windings N1 and N3 to have a substantially circular shape.

Similarly, the second coil pair 26 is alternately wound, for each one electromagnetic tool around the center pole 105A of the first coil member 101A and that of the second coil member 102A so as to be disposed in the circular space SC. This allows the second coil pair 26 composed of the second and fourth primary windings N2 and N4 to have a substantially circular shape.

In the first modification, the integrated secondary coil member 113 is provided with a substantially circular portion consisting of a first semicircular portion and a second semicircular portion whose both ends continuously extend from both ends of the first semicircular portion. The first semicircular portion is arranged between the first primary winding N1 and the second primary winding N2 so as to be around the center pole 105A of the first coil member 101A, which constitutes the first secondary winding N3 of one electromagnetic turn (spatially half turn).

Similarly, the second semicircular portion is arranged between the third primary winding N4 and the fourth primary winding N5 so as to be around the center pole 105A of the second coil member 102A, which constitutes the second secondary winding N5 of one electromagnetic turn (spatially half turn).

The remaining structure of the integrated transformer assembly Tas1 is substantially identical to that of the integrated transformer assembly Tas.

As described above, in the integrated transformer assembly Tas1, the arrangements of the center poles 105S and the side poles 106A and 107A of each of the first and second cores 103A and 104A provide a substantially circular space SC between the parts P1 of the outer periphery of the center poles 105a and the longitudinal sides S of the side poles 106A and 107A of each of the first and second cores 103A and 104A. This allows each of the first coil pair 25 and the second coil pair 26 disposed in the circular space SC to have a substantially circular shape.

As compared with the integrated transformer assembly Tas having each of the first coil pair 25 and the second coil pair 26 with a substantially ellipsoidal shape. Therefore, in addition to the effects identical with those obtained by the integrated transformer assembly Tas, it is possible to obtain an effect of reduction in the length of each of the first and second coil pairs 25 and 26, thus reducing the integrated transformer assembly Tas1 in size and weight. The reduction in the length of each of the first and second coil pairs 25 and 26 also allows coil loss thereof to be further reduced.

In the integrated transformer assembly Tas1, the cross sectional area of each of the first and second magnetic paths of the first core member 101A at the center pole 105A has a substantially semicircular shape, and similarly, the cross sectional area of each of the first and second magnetic paths of the second core member 102A at the center pole 105A has a substantially semicircular shape.

This can ensure the cross sectional area of each of the first and second magnetic pats of each of the first and second core members 101A and 102A at the center pole 105A that is wide enough to follow the magnetic fluxes respectively created by the first and second coil pairs 25 and 26.

Figure 32:
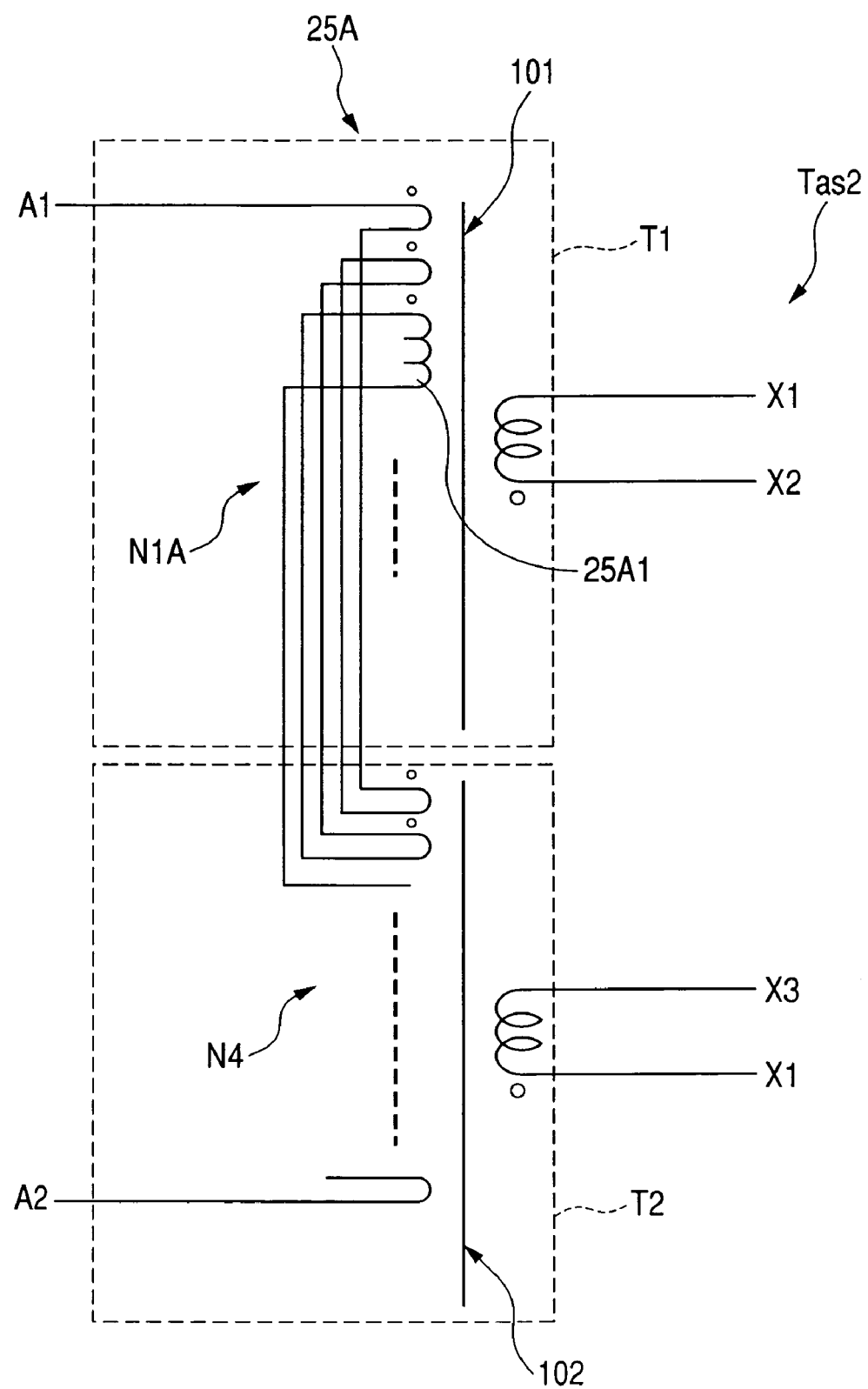
FIG. 32 is a view schematically illustrating the structure of part of an integrated transformer assembly according to a second modification of the embodiment of the present invention.

The structure of part of an integrated transformer assembly Tas2 according to a second modification of the embodiment of the present invention is illustrated in FIG. 32.

In the integrated transformer assembly Tas2, the structure of a first coil pair 25A is different from that of the first coil pair 25 illustrated in FIGS. 28 and 29.

Specifically, part 25A1 of a first primary winding N1A of the first coil pair 25A is sequentially wound around the center pole 105 of the first coil member 101.

With the structure of the integrated transformer assembly Tas2, when the number of turns of the first primary winding N1A is different from that of turns of the third primary winding N4, adjust of the number of turns of the part of the first primary winding N1A of the first coil pair 25A allows the difference of the number of turns to be buffered.

Part of the third primary winding N4 of the first coil pair 25A can be sequentially wound around the center pole 105 of the first coil member 101 so as to buffer the difference in the number of turns between the first and third primary windings N1 and N4. The same can be applied to the second coil pair 26.

Regarding the second modification of the embodiment of the present invention, at both ends of the first coil pair 25, at least one electromagnetic turn of the first primary winding N1 can be arranged, and, at both ends of the first coil pair 25, at least one electromagnetic turn of the third primary winding N4 can be arranged.

Similarly, at both ends of the second coil pair 26, at least one electromagnetic turn of the second primary winding N2 can be arranged, and, at both ends of the second coil pair 26, at least one electromagnetic turn of the fourth primary winding N5 can be arranged.

Figure 33:
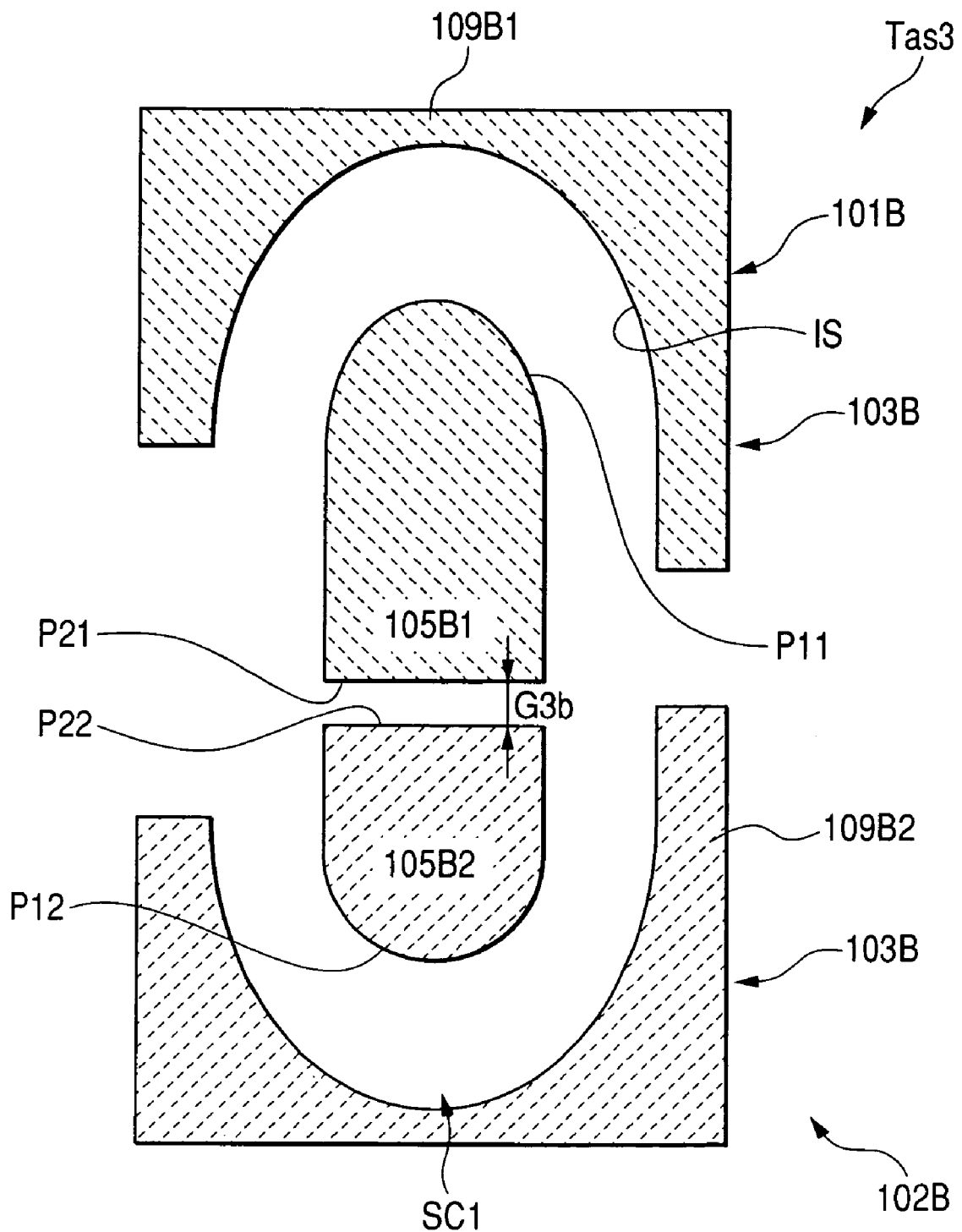
FIG. 33 is a cross sectional view schematically illustrating the structure of part of an integrated transformer assembly according to a third modification of the embodiment of the present invention.

The structure of part of an integrated transformer assembly Tas3 according to a third modification of the embodiment of the present invention is illustrated in FIG. 33.

In the integrated transformer assembly Tas3, each of first and second core members 101B and 102B of the integrated transformer assembly Tas3 is different from a corresponding one of the first and second core members 101 and 102 according to the embodiment.

Specifically, each of the first and second core members 101B and 102B of the integrated transformer assembly Tas3 consists of a first core 103B and a second core 104B. The second core 104B is not illustrated in FIG. 33, but it has a substantially identical structure with that of the first core 103B.

The first core 103B of the first core member 101B is provided with a first center pole 105B1 with a predetermined height and a substantially semi-ellipsoid shape in its lateral cross section orthogonal to the predetermined height. The first core 103B of the second core member 102B is provided with a second center pole 105B2 with a predetermined height and a substantially semi-ellipsoid shape in its lateral cross section orthogonal to the predetermined height.

The first center pole 105B1 has an outer periphery. A first portion P11 of the outer periphery of the center pole 105B1 extends in a circle in a lateral direction orthogonal to the predetermined height. Similarly, the center pole 105B2 has an outer periphery. A first portion P12 of the outer periphery of the center pole 105B2 extends in a circle in a lateral direction orthogonal to the predetermined height.

The first portion P11 of the outer periphery of the center pole 105B1 is longer in length than the first portion P12 of the outer periphery of the center pole 105B2.

A second portion P21 of the outer periphery of the center pole 105B1, which is opposite to the first portion P11 thereof, linearly extends. Similarly, a second portion P22 of the outer periphery of the center pole 105B2, which is opposite to the first portion P12 thereof, linearly extends.

The center pole 105B1 of the first core 103B1 is arranged such that:

the second portion P21 of the outer periphery of the center pole 105B1 faces the center portion P22 of the outer periphery of the center pole 105B2 with a gap G3b therebetween; and a trajectory along each of the first portions P11 and P12 of the outer peripheries of the respective center poles 105B1 and 105B2 in the lateral direction has a substantially circular shape.

The first core 103B of the first core member 101B is provided with a substantially C-shaped side pole 109B1 with a predetermined height, and the first core 103B of the second core member 102B is also provided with a substantially C-shaped side pole 109B2 with a predetermined height.

Each of the C-shaped side poles 109B1 and 109B2 has an inner side IS in its lateral cross section orthogonal to the predetermined height. The inner side IS of each of the C-shaped side poles 109B1 and 109B2 is inwardly curved in a circle in a lateral direction orthogonal to the predetermined height.

The C-shaped side poles 109B1 and 109B2 are arranged such that the inner sides IS of them are opposite to each other via the first portions P11 and P12 of the outer periphery of the center poles 105B1 and 105B2, respectively, so as to provide a substantially ellipsoidal space therebetween.

Like the integrated transformer assembly Tas1, the structure of the first core member 101B provides a closed magnetic circuit consisting of a first pair of magnetic paths. One magnetic path of the first pair of magnetic paths is composed of, in the first core member 101B, the center pole 105B1 of the first core 103B, the center pole 105B1 of the second core 104B, one side of the C-shaped pole 109B1 of the second core 104B, and one side of the C-shaped pole 109B1 of the first core 103B.

The other magnetic path of the first pair of magnetic paths is composed of, in the first core member 101B, the center pole 105B1 of the first core 103B, the center pole 105B1 of the second core 104B, the other side of the C-shaped pole 109B1 of the second core 104B, and the other side of the C-shaped pole 109B1 of the first core 103B.

Similarly, the structure of the second core member 102B provides a closed magnetic circuit consisting of a second pair of magnetic paths. One magnetic path of the second pair of magnetic pats is composed of, in the first magnetic path, the center pole 105B1 of the first core 103B, the center pole 105B1 of the second core 104B, one side of the C-shaped pole 109B1 of the second core 104B, and one side of the C-shaped pole 109B1 of the first core 103B.

The other magnetic path of the second pair of magnetic paths is composed of, in the second core member 1029, the center pole 105B1 of the first core 103B, the center pole 105B1 of the second core 104B, the other side of the C-shaped pole 109B1 of the second core 104B, and the other side of the C-shaped pole 109B1 of the first core 103B.

A combination of a cross sectional area of each of the first pair of magnetic paths of the first core member 101B and that of each of the second pair of magnetic paths of the second core member 102B has a substantially rectangular shape illustrated by hatching in FIG. 33.

As well as the embodiment of the present invention set forth above, the first coil pair 25 is alternately wound around the center pole 105B1 of the first coil member 101B and the center pole 105B2 of the second coil member 102B for each one electromagnetic turn so as to be disposed in the ellipsoidal space SC1. This allows the first coil pair 25 composed of the first and third primary windings N1 and N3 to have a substantially ellipsoidal shape.

Similarly, the second coil pair 26 is alternately wound, for each one electromagnetic turn, around the center pole 105B1 of the first coil member 101B and the center pole 105B2 of the second coil member 102B so as to be disposed in the ellipsoidal space SC1. This allows the second coil pair 26 composed of the second and fourth primary windings N2 and N4 to have a substantially ellipsoidal shape.

In the third modification, the first portion P11 of the outer periphery of the center pole 105B1 of the first core member 101B is longer in length from the first portion P12 of the outer periphery of the center pole 105B2 of the second core member 102B.

This allows the amount of magnetic fluxes created in the first core member 101B to be greater than that of magnetic fluxes created in the second core member 102B.

Specifically, in the third modification, adjustment of the difference in length between the first portion P11 of the outer periphery of the center pole 105B1 of the first core member 101B and the first portion P12 of the outer periphery of the center pole 105B2 of the second core member 102B allows the amount of magnetic fluxes created in each of the first and second core members 101B and 102B to be controlled with the overall structure of the integrated transformer assembly Tas3 being maintained to a rectangular cylindrical structures.

In addition, in the third modification, the C-shaped side poles 109B1 and 109B2 of the first and second core members 101B and 102B can reduce magnetic flux leakage from therefrom.

In place of each of the E-shaped cores 103 and 104 according to the embodiment, another general-purpose core can be used. For example, a C-shaped core provided with a first pole and a second pole parallel to each other can be used in place of each of the E-shaped cores 103 and 104 according to the embodiment.

In the present invention, in place of the active clamp circuit 12 illustrated in FIGS. 2 and 10, a common active clamp circuit can be used to prevent surge voltages from occurring when the first switching element Q1 is turned off.

In the present invention, as the rectifier circuit 55, a diode rectifier can be used in place of the synchronous rectifier 21. The synchronous rectifier 21 can be configured to operate as an inverter to convert an input DC voltage into an AC voltage so as to send the converted AC voltage to the battery 2.

While there has been described what is at present considered to be the embodiments and modifications of the invention, it will be understood that various modifications which are not described yet may be made therein, and it is intended to cover in the appended claims all such modifications as fall within the true spirit and scope of the invention.

What is claimed is:

1. An integrated transformer assembly comprising:
a first core member constituting a first magnetic path;
a second core member constituting a second magnetic path, the second magnetic path being separated from the first magnetic path, the first and second core members being physically separated from each other;
a common coil member having a first portion configured to be alternately wound, for each one electromagnetic turn, around the first core member and around the second core member, the first portion of the common primary coil member wound around the first core member being magnetically linked to the first magnetic path thereof so as to constitute a first primary coil, the first portion of the common primary coil member wound around the second core member being magnetically linked to the second magnetic path thereof so as to constitute a second primary coil, the first primary coil and the second primary coil being connected in series; and
a secondary coil member having a first secondary coil and a second secondary coil, the first and second secondary coils being arranged to be magnetically linked to the first and second magnetic paths of the first and second core members, respectively.

2. An integrated transformer according to claim 1, wherein the common coil member is entirely configured to be alternately wound, for each one electromagnetic turn, around the first core member and around the second core member.

3. An integrated transformer according to claim 1, wherein the common coil member has a second portion configured to be sequentially wound, for each one electromagnetic turn, at least one of around the first core member and around the second core member, the second portion of the common primary coil member wound at least one of around the first core member and around the second core member being magnetically linked to a corresponding at least one of the first and second magnetic paths so as to constitute part of a corresponding at least one of the first and second primary coils.

4. An integrated transformer assembly according to claim 1, wherein the secondary coil member has a portion configured to be alternately wound, for each one electromagnetic turn, around the first core member and around the second core member, the portion of the secondary coil member wound around the third part of the first core member constituting a first secondary coil of the secondary coil member to be magnetically linked to the first primary coil, the portion of the secondary coil member wound around the second core member constituting a second secondary coil of the secondary coil member to be magnetically linked to the second primary coil.

5. An integrated transformer assembly according to claim 1, wherein each of the first and second core members comprises:
- a base having one surface;
- a first pole arranged opposing the one surface of the base to be magnetically coupled thereto, the first pole extending away from the one surface of the base; and
- a second pole arranged opposing the one surface of the base to be magnetically coupled thereto, the second pole extending away from the one surface of the base in parallel to the first pole,
- the first pole of the first core member and that of the second core member being arranged opposing each other with a first gap therebetween,
- the second pole of the first core member and that of the second core member being arranged opposing each other with a second gap therebetween.

6. An integrated transformer assembly according to claim 5, wherein each of the first and second core members further comprises:
- a third pole arranged opposing the one surface of the base to be magnetically coupled thereto, the third pole extending away from the one surface of the base in parallel to the first pole, the second and third poles being aligned across the first pole,
- the third pole of the first core member and that of the second core member being arranged opposing each other with a third gap therebetween.

7. An integrated transformer assembly according to claim 5, wherein the first pole of the first core member and that of the second core member have a same length, the second pole of the first core member and that of the second core member have a same length, the first and second poles of the first core member are aligned with those of the second core member in their length directions with the first and second gaps therebetween, respectively.

8. An integrated transformer assembly according to claim 1, wherein each of the first and second core members comprises:
- a base having one surface;
- a first pole arranged opposing the one surface of the base to be magnetically coupled thereto, the first pole extending away from the one surface of the base; and
- a second pole member arranged opposing the one surface of the base to be magnetically coupled thereto, the second pole member extending away from the one surface of the base in parallel to the first pole, the second pole member having one side facing the first pole, the one side of the second pole member being circumferentially curved inwardly in a direction orthogonal to the magnetic path therein,
- the first pole of the first core member and that of the second core member being arranged opposing each other with a first gap therebetween,
- the second pole member of the first core member and that of the second core member being arranged opposing each other with a second gap therebetween.

9. An integrated transformer assembly according to claim 8, wherein the first pole of each of the first and second core members has one side facing the circumferentially curved one side of the second pole, the one side of the first pole being circumferentially curved outwardly toward the one side of the second pole in a direction orthogonal to the magnetic path therein, the one side of the second pole and the one side of the first pole of the first core member providing a substantially annular space therebetween, the one side of the second pole and the one side of the first pole of the second core member providing a substantially annular space therebetween, the first portion of the common primary coil member being installed in the annular space between the one side of the second pole and the one side of the first pole of the first core member and in the annular space between the one side of the second pole and the one side of the first pole of the second core member.

10. An integrated transformer assembly according to claim 1, wherein the first primary coil and the second primary coil are configured to be alternately wound, for each spatially half turn, around the first core member and around the second core member.

11. A DC to DC converter comprising:
- an integrated transformer assembly according to claim 1, the first primary coil, the first secondary coil, and the first core member constituting a first transformer, the second primary coil, the second secondary coil, and the second core member constituting a second transformer;
- an inverter circuit provided with at least one switching element via which input DC power is supplied, the inverter circuit being configured to turn the at least one switching element on and off in accordance with a predetermined duty cycle to convert the input DC power into AC power, thus supplying the converted AC power to the first and second primary coils of the first and second transformers, the first and second transformers being configured to alternately execute a transformer operation and a reactor operation so as to generate secondary AC power in the first and second secondary coils of the integrated transformer assembly; and
- a rectifier configured to rectify the secondary AC power generated in the first and second secondary coils to thereby output DC power.

12. A DC to DC converter according to claim 11, wherein the input DC power is supplied to the inverter circuit from a DC power source, the first primary coil includes a first primary winding and a second primary winding, the second primary coil includes a third primary winding and a fourth primary winding, one end of the first primary winding and one end of the third primary winding are connected to each other in series, one end of the second primary winding and one end of the fourth primary winding are connected to each other in series, the other end of third primary winding and the other end of the fourth primary winding are connected to each other so as to constitute a common terminal, the other end of the first primary winding is connected to a positive terminal of the DC power source, and the other end of the second primary winding serves as an individual terminal of the series-connected second and fourth primary windings, and wherein the inverter circuit comprises:
- a first switching element to establish a connection between the common terminal and a negative terminal of the DC power source;
- an active clamp circuit provided with a second switching element and a first capacitor connected to each other in series, the active clamp circuit being configured to:
- establish a connection between the common terminal and the individual terminal of the series-connected second and fourth primary windings; and
- bypass, when the first switching element is turned off, a current flowing through the first switching element just before the first switching element being turned off; and
- a second capacitor to establish a connection between the individual terminal of the series-connected second and fourth primary windings and the negative terminal of the DC power source.

13. A DC to DC converter comprising:
an integrated transformer assembly comprising:
- a core constituting a magnetic path, the core comprising:
  - a pair of first and second bases, each base having one surface, the first and second bases being separated from each other;
  - a pair of first and second poles each arranged opposing the one surface of a corresponding one of the first and second bases to be magnetically coupled thereto, the first and second poles extending away from the one surface of a corresponding one of the first and second bases, the first and second poles being arranged opposing each other with a first gap therebetween, each of the first and second poles having a substantially semicircular cross section orthogonal to the magnetic path in a corresponding one of the first and second poles, the first and second poles with the gap collectively having one of a substantially circular cross section and a substantially ellipsoidal cross section, the one of the substantially circular cross section and the substantially ellipsoidal cross section being orthogonal to the magnetic path in each of the first and second poles; and
  - a pair of pole members each arranged opposing the one surface of a corresponding one of the first and second bases to be magnetically coupled thereto, the second pole member extending away from the one surface of a corresponding one of the first and second bases, the second pole member at least partially surrounding the pair of first and second poles;
  - the first base, the first pole and one of the pole members constituting a first core member, the second base, the second pole and the other of the pole members constituting a second core member, the first core member and the second core member being physically separated from each other;
- a primary coil member composed of a first primary coil and a second primary coil connected to each other in series, the first and second primary coils being collectively wound around the paired first and second poles, the first primary coil being magnetically linked to the magnetic path of the first pole, the second primary coil being magnetically linked to the magnetic path in the second pole; and
- a secondary coil member composed of a first secondary coil and a second secondary coil, the first and second secondary coils being wound around the first and second poles to be magnetically linked to the magnetic paths of the first and second poles, respectively, the first primary coil, the first secondary coil, and the core constituting a first transformer, the second primary coil, the second secondary coil, and the core constituting a second transformer;
- an inverter circuit provided with at least one switching element via which input DC power is supplied, the inverter circuit being configured to turn the at least one switching element on and off in accordance with a predetermined duty cycle to convert the input DC power into AC power, thus supplying the converted AC power to the first and second primary coils of the first and second transformers, the first and second transformers being configured to alternately execute a transformer operation and a reactor operation so as to generate secondary AC power in the first and second secondary coils of the integrated transformer assembly; and
- a rectifier configured to rectify the secondary AC power generated in the first and second secondary coils to thereby output DC power.

14. A DC to DC converter according to claim 13, wherein one wire strap is configured to be alternately wound, for each one electromagnetic turn, around the first pole and around the second pole, a portion of the one wire strap wound around the first pole constituting the first primary coil, another portion of the one wire strap wound around the second pole constituting the second primary coil.

* * * * *